US012182792B2

(12) United States Patent
Chitalia et al.

(10) Patent No.: US 12,182,792 B2
(45) Date of Patent: Dec. 31, 2024

(54) SYSTEMS AND METHODS FOR USING A TRANSACTION IDENTIFIER TO PROTECT SENSITIVE CREDENTIALS

(71) Applicant: Visa International Service Association, San Francisco, CA (US)

(72) Inventors: Jalpesh Chitalia, Castro Valley, CA (US); Ansar Ansari, San Francisco, CA (US); Samuel Shrauger, Lafayette, CA (US)

(73) Assignee: Visa International Service Association, San Francisco, CA (US)

( * ) Notice: Subject to any disclaimer, the term of this patent is extended or adjusted under 35 U.S.C. 154(b) by 155 days.

(21) Appl. No.: 17/847,610

(22) Filed: Jun. 23, 2022

(65) Prior Publication Data

US 2022/0318799 A1  Oct. 6, 2022

Related U.S. Application Data

(62) Division of application No. 16/032,950, filed on Jul. 11, 2018, now Pat. No. 11,397,947.

(Continued)

(51) Int. Cl.
*G06Q 20/38* (2012.01)
*G06Q 20/22* (2012.01)
(Continued)

(52) U.S. Cl.
CPC ......... *G06Q 20/326* (2020.05); *G06Q 20/227* (2013.01); *G06Q 20/3574* (2013.01);
(Continued)

(58) Field of Classification Search
CPC .......... G06Q 20/38215; G06Q 20/383; G06Q 20/385; G06Q 20/326; G06Q 20/227; G06Q 20/3672; G06Q 20/3574
(Continued)

(56) References Cited

U.S. PATENT DOCUMENTS 5,883,810 A * 3/1999 Franklin ................ G06Q 30/06
235/379
6,748,426 B1 * 6/2004 Shaffer .................... G10L 15/30
704/E15.047

(Continued)

FOREIGN PATENT DOCUMENTS

| CN | 105531733 A | 4/2016 |
|---|---|---|
| KR | 20160013221 | 2/2016 |
| WO | 2017165576 | 9/2017 |

OTHER PUBLICATIONS

U.S. Appl. No. 16/032,950 , Final Office Action, Mailed On Feb. 3, 2021, 13 pages.

(Continued)

*Primary Examiner* — Mohammad A. Nilforoush
*Assistant Examiner* — Wodajo Getachew
(74) *Attorney, Agent, or Firm* — Kilpatrick Townsend & Stockton LLP

(57) ABSTRACT

Embodiments of the invention are directed to systems and methods of securely transmitting account credentials, such as a token. A user device and application can initially select an account, and then obtain a transaction identifier associated with the account. The user device can provide the transaction identifier to a resource provider, which can then directly exchange the transaction identifier for the account credentials.

15 Claims, 10 Drawing Sheets

Related U.S. Application Data

(60) Provisional application No. 62/531,301, filed on Jul. 11, 2017.

(51) Int. Cl.
  G06Q 20/32 (2012.01)
  G06Q 20/34 (2012.01)
  G06Q 20/36 (2012.01)

(52) U.S. Cl.
  CPC ... G06Q 20/3672 (2013.01); G06Q 20/38215 (2013.01); G06Q 20/383 (2013.01); G06Q 20/385 (2013.01)

(58) Field of Classification Search
  USPC .......................................................... 705/75
  See application file for complete search history.

(56) References Cited

U.S. PATENT DOCUMENTS

| | | | |
|---|---|---|---|
| 8,613,055 | B1 | 12/2013 | Tomilson et al. |
| 8,966,584 | B2 | 2/2015 | Hughes et al. |
| 2008/0180212 | A1 | 7/2008 | Aikawa et al. |
| 2009/0158392 | A1* | 6/2009 | Hughes ................... H04L 63/08 726/3 |
| 2010/0125510 | A1 | 5/2010 | Smith et al. |
| 2011/0113237 | A1* | 5/2011 | Hird ........................ G06F 21/34 713/184 |
| 2012/0095852 | A1 | 4/2012 | Bauer et al. |
| 2012/0143752 | A1 | 6/2012 | Wong et al. |
| 2012/0173431 | A1 | 7/2012 | Ritchie et al. |
| 2012/0310826 | A1* | 12/2012 | Chatterjee .............. G06Q 20/36 705/41 |
| 2013/0013508 | A1 | 1/2013 | Carlson |
| 2013/0144792 | A1* | 6/2013 | Nilsson ................. G07F 7/1091 705/67 |
| 2015/0112870 | A1 | 4/2015 | Nagasundaram et al. |
| 2015/0127529 | A1 | 5/2015 | Makhotin et al. |
| 2015/0142671 | A1 | 5/2015 | Dicker et al. |
| 2015/0319158 | A1 | 11/2015 | Kumnick |
| 2016/0005038 | A1* | 1/2016 | Kamal ............... G06Q 20/3223 705/44 |
| 2016/0342663 | A1 | 11/2016 | Friedman et al. |
| 2017/0070500 | A1 | 3/2017 | Hockey et al. |
| 2017/0163617 | A1 | 6/2017 | Laxminarayanan et al. |
| 2017/0278096 | A1 | 9/2017 | Chitalia et al. |
| 2018/0089669 | A1 | 3/2018 | Singh |
| 2018/0174137 | A1 | 6/2018 | Subbarayan et al. |
| 2020/0065800 | A1* | 2/2020 | Kusnanto ............... G06Q 20/12 |

OTHER PUBLICATIONS

U.S. Appl. No. 16/032,950, Non-Final Office Action, Mailed On Oct. 29, 2021, 12 pages.
U.S. Appl. No. 16/032,950, Non-Final Office Action, Mailed On Sep. 30, 2020, 16 pages.
U.S. Appl. No. 16/032,950, Notice of Allowance, Mailed On Mar. 30, 2022, 8 pages.
Application No. EP18831093.2, Extended European Search Report, Mailed On Jun. 3, 2020, 8 pages.
Application No. EP18831093.2, Office Action, Mailed On Dec. 3, 2021, 8 pages.
Application No. PCT/US2018/041686, International Preliminary Report on Patentability, Mailed On Jan. 23, 2020, 11 pages.
Application No. PCT/US2018/041686, International Search Report and Written Opinion, Mailed On Nov. 30, 2018, 15 pages.
Application No. SG11201911660W, Further Written Opinion, Mailed On Mar. 21, 2022, 8 pages.
Application No. SG11201911660W, Written Opinion, Mailed On Jul. 14, 2021, 7 pages.
Application No. SG11201911660W, Notice of Decision to Grant, Mailed On May 8, 2023, 6 pages.
Application No. CN201880046466.1, Office Action, Mailed On Dec. 29, 2023, 28 pages with English translation.
Application No. CN201880046466.1, Office Action, Mailed On Mar. 31, 2023, with English Translation, 23 pages.
Chen et al., "Asp.net Project Development Practice Tutorials", Wuhan University Press, Oct. 31, 2016, 12 pages.
Application No. CN201880046466.1, Office Action, Mailed On Apr. 8, 2024, 24 pages with English translation.
Li et al., "Java Web Development Technology and Project Practice", University of Science and Technology of China Press, Aug. 31, 2016, 7 pages.
Application No. CN201880046466.1, Office Action, mailed Jun. 22, 2024, 22 pages with translation.
Application No. EP18831093.2, Office Action, Mailed On Oct. 24, 2024, 9 pages.

* cited by examiner

SYSTEMS AND METHODS FOR USING A TRANSACTION IDENTIFIER TO PROTECT SENSITIVE CREDENTIALS

CROSS-REFERENCES TO RELATED APPLICATIONS

This application is a divisional of U.S. patent application Ser. No. 16/032,950 filed Jul. 11, 2018, which is a non-provisional application that claims priority to U.S. Patent Application No. 62/531,301, filed on Jul. 11, 2017, the disclosures of which are herein incorporated by reference in their entireties for all purposes.

BACKGROUND

Because conducting transactions over electronic networks such as the Internet has a number of advantages that include convenience and lower costs, electronic transactions are increasing in volume. However, while convenient for the user, online transactions can introduce new vulnerabilities for data security.

For example, in order to conduct an online transaction, a user may provide a set of account credentials to a resource provider server. Due to the fact that typical transaction systems and communications involve several parties (e.g., a user, applications on a user device, a resource provider, a transaction processing network, an authorizing entity, etc.), the process of obtaining and providing the account credentials can result in a number of entities viewing and/or handling the account credentials. For example, a user device and an application (e.g., a browser application) operating on the user device may communicate with a server computer associated with an entity that manages an account (e.g., an authorizing entity) to obtain the account credentials. Then, the user device may transmit the account credentials to the resource provider computer. As a result, the account credentials and potentially other sensitive data is exposed to the user device, the browser application, and/or any other routing computers. Each data transmission and system that handles the sensitive data poses a potential threat of the data being stolen or lost. Additionally, it is a burden for each of these entities to create sufficiently secure data storage and transmission systems.

Embodiments of the present invention address these problems and other problems, individually and collectively.

SUMMARY

Described herein are a system and techniques for securely providing account credentials to a resource provider for a transaction. Upon selection of an account by a user at a user device, the user device and/or application executed by the user device can transmit the account selection results to a server computer in order to request account credentials for the account. Instead of transmitting the account credentials to the user device, the server computer can generate and transmit a transaction identifier to the user device. An application executed on the user device can, in turn, transmit the transaction identifier to the resource provider. Then, the resource provider can transmit the transaction identifier back to the server computer, thereby establishing a direct line of communication between the resource provider and the server computer. The server computer can identify the account based on the transaction identifier, and can then transmit the account credentials (e.g., a token) to directly to the resource provider. As a result, the account credentials are not shown to the user device or application during transmission to the resource provider.

One embodiment of the invention is directed to a method comprising receiving, from an application, a request for a transaction identifier associated with an account selected by a user, generating the transaction identifier associated with the account selected by a user, transmitting the transaction identifier to the application, wherein the application transmits the transaction identifier to a resource provider computer, receiving the transaction identifier from the resource provider computer, identifying the account selected by a user based on the received transaction identifier, obtaining account credentials for the account, and transmitting the account credentials to the resource provider computer.

Another embodiment of the invention is directed to a server computer configured to perform the above-described method.

Another embodiment of the invention is directed to a method comprising receiving a request to complete a transaction associated with a user, determining a number of accounts associated with the user, receiving a selection of an account from the number of accounts, sending a request for a transaction identifier associated with the selected account to a server computer, receiving the transaction identifier from the server computer, and transmitting the transaction identifier to a resource provider computer, wherein the resource provider computer subsequently transmits the transaction identifier to the server computer, and wherein the server computer responds to the resource provider computer by transmitting account credentials associated with the selected account.

Another embodiment of the invention is directed to a user device configured to perform the above-described method.

Further details regarding embodiments of the disclosure can be found in the Detailed Description and the Figures.

DETAILED DESCRIPTION

Figure 1:
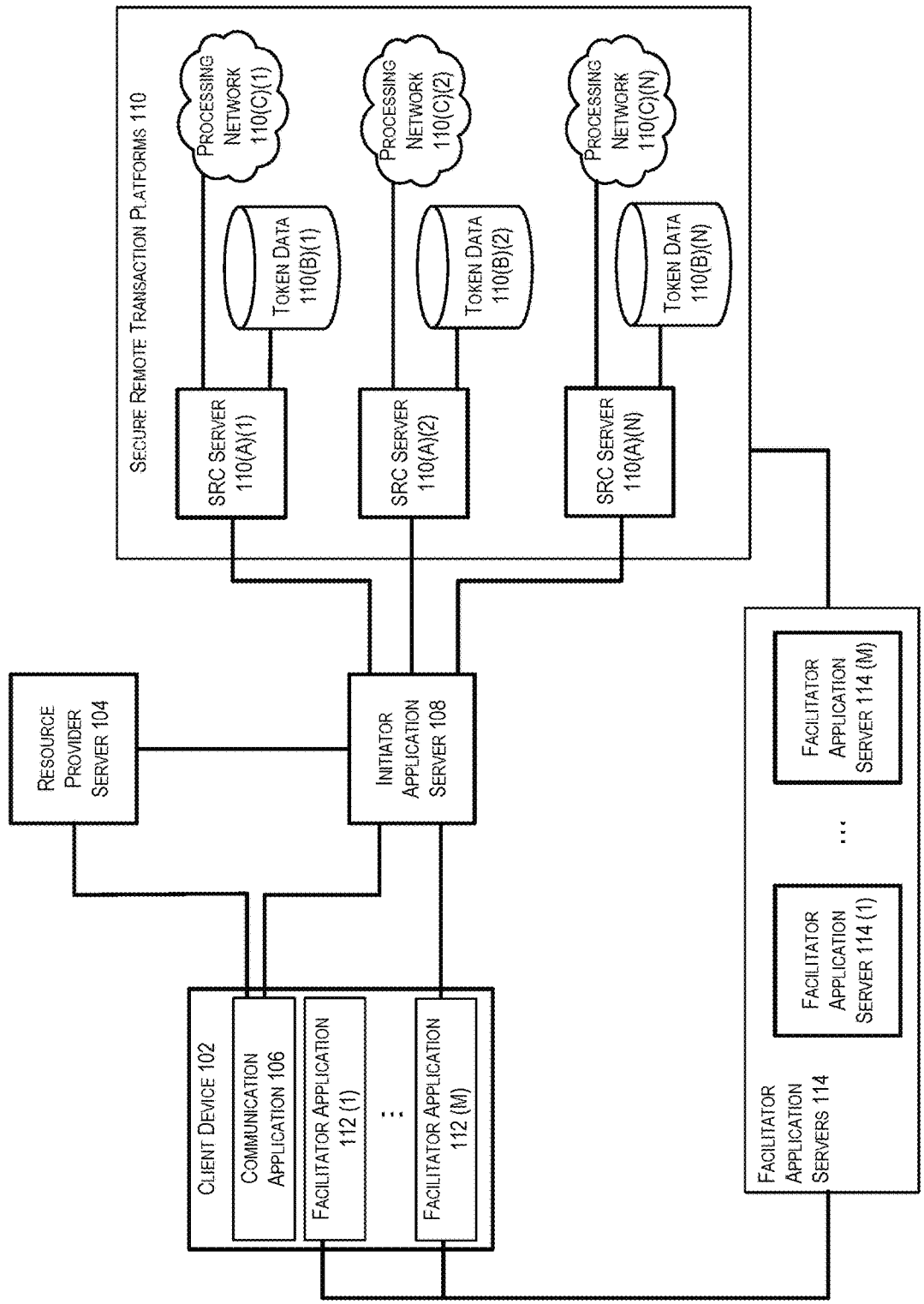
FIG. 1 depicts a number of components that may be involved in a system used to implement at least some embodiments of the disclosure.

Embodiments of the invention are directed to improving the efficiency and security of the transmission of account credentials for a remote electronic transaction by first transmitting a transaction identifier that can be directly exchanged for account credentials. For example, a user can operate a user device application to access a resource provider webpage and to select one or more items for purchase via the webpage. The user can select an account to use for the purchase, and the user device application can electronically communicate that selection to a server computer associated the account. The server computer can then generate a transaction identifier to be associated with the selected account, and store a record of the transaction identifier. Then, the server computer can, instead of providing the account credentials directly to the user device application, transmit a transaction identifier to the user device application.

Upon receipt of the transaction identifier, the user device application can transmit the transaction identifier to the resource provider. Then, the resource provider can communicate directly with the server computer in order to exchange the transaction identifier for the account credentials. The server computer can identify the account based on the transaction identifier, obtain account credentials (e.g., a PAN or a token) for the account, and then transmit the account credentials directly to the resource provider.

As a result, the account credentials are not shown to the user device application during transmission to the resource provider. The first set of communications (e.g., for selecting an account and obtaining a transaction identifier) can primarily take place through a first communication channel that includes the user device (e.g., an application executed on the device) and the server computer. Then, the second set of communications (e.g., for obtaining the account credentials) can primarily take place through a second communication channel that includes the resource provider and the server computer. The separation of these communications across two different communication channels enables a shorter, more efficient, and more secure transmission of the account credentials to the resource provider. Additionally, efficiency is improved by reducing the number of systems that need to be equipped for secure management of sensitive data.

Additionally, embodiments simplify electronic resource provider acceptance by providing a standardized payload, integrating local security applications, and increasing resource provider trust for transactions conducted. In embodiments of the disclosure, users are provided the capability to select from a number of their accounts, each of which may be associated with a different secure remote transaction platform, to complete a transaction. The transaction may then be made more secure through the use of a local facilitator application that supports the selected account.

In embodiments of the disclosure, a user may be provided with the ability to select a checkout element embedded in a resource provider checkout page accessed via an application executed by a client computing device. Upon selection of the checkout element, the client computing device may be caused to initiate communication with a remote initiator server. The initiator server may receive a number of transaction details from the application on the client computing device, as well as user-identifying information. In some embodiments, the initiator server may derive various information from cookies placed upon the client computing device.

In some embodiments, the initiator server, upon receiving this information, may identify a user identity associated with the transaction. Once the user identity has been identified, the initiator server may determine a number of accounts associated with that user identity. A list of these accounts may be provided to the client computing device to be presented to the user. Upon selection of one of the accounts, the initiator server may communicate the selection to a secure remote transaction (SRT) platform associated with that account.

The SRT platform may then identify a number of facilitator applications that support authentication of the selected account and are installed on the client computing device (or a different device operated by the user). In some embodiments, the list may also be provided to the client computing device for selection by the user. In some embodiments, a particular facilitator application may be selected automatically (e.g., without user interaction) by the SRT platform. The SRT platform may provide instructions to the client computing device to cause the selected facilitator application to execute. The facilitator application may subsequently perform an authentication process to verify the identity of the user of the client computing device. Once authenticated, the facilitator application may provide an authentication indicator back to the SRT platform. Upon receiving this authentication indicator, the SRT platform may generate a token specific to the transaction, which may then be provided to the initiator application and subsequently to the resource provider in order to complete the transaction.

Prior to discussing specific embodiments of the invention, some terms may be described in detail.

An "access device" may be any suitable device that provides access to a remote system. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device.

"Account credentials" may include any suitable information associated with an account (e.g. an account and/or portable device associated with the account). Such information may be directly related to the account or may be derived from information related to the account. Examples of account credentials may include a PAN (primary account number or "account number"), user name, expiration date, CVV (card verification value), dCVV (dynamic card verification value), CVV2 (card verification value 2), CVC3 card verification values, etc.

An "acquirer" may typically be a business entity (e.g., a commercial bank) that has a business relationship with a particular resource provider or other entity. Some entities can perform both issuer and acquirer functions. Some embodiments may encompass such single entity issuer-acquirers. An acquirer may operate an acquirer computer, which can also be generically referred to as a "transport computer."

An "authentication indicator" may be any suitable piece of data that provides additional proof that a particular circumstance is authentic. Exemplary authentication indictors may include cryptograms, flags, or other data which can indicate that a user was authenticated by a computing device.

An "authorization request message" may be an electronic message that requests authorization for a transaction. In some embodiments, it is sent to a transaction processing computer and/or an issuer of a portable device to request authorization for a transaction. An authorization request message according to some embodiments may comply with ISO 8583, which is a standard for systems that exchange electronic transaction information associated with a payment made by a user using a portable device or account. The authorization request message may include an issuer account identifier that may be associated with a portable device or account. An authorization request message may also comprise additional data elements including one or more of: a service code, a CVV (card verification value), a dCVV (dynamic card verification value), a PAN (primary account number or "account number"), a token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the resource provider's access device (e.g. POS equipment) that indicates approval of the transaction.

An "authorization entity" may be an entity that authorizes a request. Examples of an authorization entity may be an issuer, a governmental agency, a document repository, an access administrator, etc. An "issuer" may typically refer to a business entity (e.g., a bank) that maintains an account for a user. An issuer may also issue account credentials stored on a user device, such as a cellular telephone, smart card, tablet, or laptop to the user.

A "computing device" may include any suitable device that can electronically process data. Examples of computing devices include desktop computers, mobile devices or mobile computing devices, television sets, etc.

An "application" may be computer code or other data stored on a computer readable medium (e.g. memory element or secure element) that may be executable by a processor to complete a task. For example, an application can include a program or group of programs designed to perform a specific function. Examples of an application include a web browser application, a shopping application, a social network application, a portion of an operating system (e.g., iOS, Android, Microsoft Windows, macOS, etc.) such as an API (application programming interface), voice-control software, a cloud-based transaction service, a facilitator application, etc.

A "cookie" (aka, a "web cookie," "Internet cookie," or "browser cookie") may be any suitable piece of data sent from a webserver and stored on a user's computer. A cookie may be placed on a user's computer by the computer's web browser while the user is browsing a website maintained by the webserver.

A "facilitator" may be any entity capable of authenticating a user of a client device. A facilitator may include a client-side application (e.g., a facilitator application) as well as a backend server (e.g., a facilitator server) capable of supporting the client-side application. In some cases, a facilitator application may be executed upon receiving instructions from a facilitator server to authenticate a user of the client device. The facilitator application may cause the client device upon which it is installed to obtain user-specific data. This user-specific data may then be compared to expected user-specific data, either by the facilitator application on the client device or by the facilitator server, to determine whether the obtained user-specific data matches the expected user-specific data. In some embodiments, a facilitator may be an electronic wallet provider (e.g., Apple Pay). It should be noted that the facilitator may be unaffiliated with the SRT Platform and/or the initiator.

An "initiator" may be any entity capable of facilitating communication between a resource provider and one or more SRT platforms. An initiator may operate a number of servers which provide at least a portion of the functionality described herein. In some cases, an initiator may obtain approval and/or accreditation from one or more SRT platforms in order to operate in conjunction with those SRT platforms. A resource provider may enroll with the initiator in order to obtain access to at least a portion of the processes described herein. An initiator may provide each resource provider that enrolls with it a link to embed within a checkout element. The link, when activated by a user wishing to transact with the resource provider, may initiate the processes described herein in order to facilitate a transaction between the user and the resource provider. It should be noted that the initiator may be unaffiliated with the SRT Platform and/or the facilitator. In some embodiments, an initiator can also be referred to as a "virtual terminal," and can perform functions for remote transactions that are analogous to the functions performed for in-person transactions by a physical terminal (e.g., a Point of Sale device).

The term "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may be a good or service, a physical building, a computer account or file, or a payment account. In some embodiments, a resource may refer to a financial product, such as a loan or line of credit.

A "resource provider" may be an entity that can provide a resource such as goods, services, information, and/or access to such a resource. Examples of a resource provider include merchants, online or other electronic retailers, access devices, secure data access points, etc. A "merchant" may typically be an entity that engages in transactions and can sell goods or services, or provide access to goods or services. A "resource provider computer" may be any computing device operated by a resource provider.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

A "secure remote transaction (SRT) platform" may be any entity capable of facilitating a transaction in the manners described. A SRT platform may be capable of communicating with an initiator, a facilitator, and a transaction processing network. In some embodiments, a SRT platform may include a SRT server, a token provider, and a transaction processing network. An SRT platform may be configured to perform one or more processes that include: receive a request for a transaction from an initiator, identify an account associated with the transaction, determine an appropriate facilitator for the account, cause the determined facilitator to authenticate a user associated with the account, generate a token to be used in the transaction, and provide the token to the initiator to complete the transaction.

A "token" may be a substitute value for a credential. A token may be a string of numbers, letters, or any other suitable characters. Examples of tokens include tokens, access tokens, personal identification tokens, etc. A token may include an identifier for an account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, an account identifier (e.g., a primary account number (PAN)) may be tokenized by replacing the primary account identifier with a substitute number (e.g. a token) that may be associated with the account identifier. Further, tokenization may be applied to any other information that may be replaced with a substitute value. Tokenization may be used to enhance transaction efficiency, improve transaction security, increase service transparency, or to provide a method for third-party enablement.

A "token provider" or "token service system" can include one or more computers that service tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of transactions submitted using tokens by de-tokenizing the token to obtain the actual PAN and conducting a transaction using that PAN. In some embodiments, a token service system may include a tokenization computer alone, or in combination with other computers such as a transaction processing network computer. Various entities of a tokenization ecosystem may assume the roles of the token provider. For example, processing networks and issuers or their agents may become the token provider by implementing the token services according to embodiments of the present invention.

A "token vault" may refer to a repository that maintains established token-to-PAN mappings. According to various embodiments, the token vault may also maintain other attributes of the token requestor that may be determined at the time of registration and that may be used by the token SRT server to apply domain restrictions or other controls during transaction processing. The token vault may be a part of the token service system. In some embodiments, the token vault may be provided as a part of the token SRT server. Alternatively, the token vault may be a remote repository accessible by the token SRT server. Token vaults, due to the sensitive nature of the data mappings that are stored and managed in them, may be protected by strong underlying physical and logical security.

A "transaction" may be any interaction or exchange between two or more parties. For example, a transaction may include a first entity requesting resources from a second entity. In this example, the transaction is completed when the resources are either provided to the first entity or the transaction is declined.

A "transaction processing network," or "processing network," may refer to an electronic payment system used to accept, transmit, or process transactions made by payment devices for money, goods, or services. The processing network may transfer information and funds among authorization entities (e.g., issuers), acquirers, merchants, and payment device users.

A "user" may include an individual. In some embodiments, a user may be associated with one or more personal accounts and/or mobile devices. The user may also be referred to as a cardholder, account holder, or consumer.

A "transaction identifier" may comprise any suitable information that serves to identify a transaction and/or an account. For example, a transaction identifier can identify a stored transaction record, a stored account record, and/or a stored set of account credentials. A transaction identifier can include a string of characters, numerals, or other identifiers. For example, a transaction identifier can be a random alphanumeric value.

FIG. 1 depicts a number of components that may be involved in a system used to implement at least some embodiments of the disclosure. In FIG. 1, a client device 102 may be in communication with a number of remote entities via a network connection (either wireless or physical). For example, the client device 102 may be used to access a website maintained by a resource provider server 104. In this example, the website may have embedded a checkout element configured to cause the client device 102 to initiate communication with a initiator application server 108. The initiator application server 108 may, in turn, be in communication with a number of secure remote transaction (SRT) platforms 110.

In some embodiments, the client device 102 may have installed on it a communication application 106. Embodiments allow the communication application 106 to include any suitable software that enables the client device 102 and/or user to communicate with the initiator application server, the resource provider server 104, and secure remote transaction platforms 110, the facilitator application server 114, and/or any other suitable computer system (e.g., in order to conduct a transaction). For example, the communication application 106 can be configured to cause the client device 102 to access an electronic storefront maintained by the resource provider server 104. In some embodiments, the communication application 106 can include a browser application which can be used to access a resource provider webpage. As another example, the communication application 106 can include a shopping application associated with the resource provider, through which the user can similarly review and select items for purchase. Additional examples of a communication application 106 include an API (application program interface), such as an operating system API (e.g., iOS API, Android API, Microsoft Windows API, macOS API, etc.). Further examples of a communication application 106 include voice-control software, programs for conducting transactions (e.g., cloud-based transaction software) that can communicate with other systems, social networking applications, one or more of the above-described examples in combination, and/or any other suitable software.

In some embodiments, the client device 102 may have installed on it a number of facilitator applications 112 (1-M). The facilitator applications may be configured to cause the client device 102 to communicate with a number of facilitator application servers 114 (1-M). In some embodiments, the client device 102 may store, in its memory, a number of cookies.

In some embodiments of the invention, the client device 102 may be a mobile device (e.g. a mobile phone). The mobile device may be capable of communicating with cell towers (e.g., via cellular communications such as GSM, LTE, 4G) and wireless routers (e.g., via WiFi). The mobile device may store the user's account credentials, such as a PAN (primary account number) or account reference ID (e.g., the last for digits of a PAN, a card display name, or other account metadata), a token, a name, an address, a CVV, an expiration date, and any other suitable information. Such data may be securely stored via hardware (e.g., a secure element) or software.

In some embodiments, the resource provider server 104 may be affiliated with an online retailer or another suitable resource provider having an electronic catalog. The resource provider server 104 may serve one or more pages of a resource provider website to a communication application 106 (e.g., a web browser application, an application interface, etc.) installed on the client device 102. In some embodiments, a website served to a browser application may contain a portal or link that, when accessed using the browser application, initiates communication with the initiator application server 108.

The initiator application server 108 may be any suitable computing device configured to identify a user, identify accounts for that user, receive a selection of one of those accounts, communicate the selected account to an SRT platform 110 associated with that account, and complete a transaction using the selected account.

In some embodiments, there may be a number of SRT platforms 110 (1-N) and the SRT platforms may each be associated with a transaction processing network. Each SRT platform may include some combination of an SRT server (or servers) 110(A), token data 110(B), and a processing network 110(C). Multiple accounts may be associated with a single SRT platform. For example, a user may be associated with two different accounts which are each associated with different authentication entities, while both accounts are able to be processed using a single SRT platform. The SRT server 110(A), may be configured to identify one or more facilitator applications 112 associated with an account and cause the user to be authenticated using one of those facilitator applications 112. This may involve communicating a request for authentication to a facilitator application server 114 associated with a particular facilitator application 112.

Additionally, once the user has been authenticated, the SRT server 110(A) may be configured to generate a token to be associated with a transaction which is stored in the respective token data 110(B). The SRT server 110(A) may pass the token to the initiator server 208, which may generate transaction information that includes the token to be used for a transaction. A mapping between the token and the transaction may be maintained by the SRT server 110(A) in its respective token data. In some embodiments, the SRT server 110(A) may receive a number of files from various authorization entities, each of which may include mappings between email addresses and various PANs. In this way, the SRT server 110(A) may maintain a mapping between user identifier information and accounts.

The facilitator applications 112 may be any suitable set of computer-executable instructions installed on the client device 102 that, when executed, causes the client device 102 to perform an authentication process. In some embodiments, the authentication process may involve the collection of biometric information associated with a user of the client device 102. For example, the facilitator application 112 may obtain voiceprint or fingerprint data to be used to authenticate the user. The facilitator application may be tied to hardware installed on the client device 102. Examples of facilitator applications 112 may include fingerprint, retinal, or voice scanning applications. The hardware associated with those applications may include fingerprint, retinal, or voice scanning hardware such as fingerprint, retinal, or voice sensors. Other types of facilitator applications 112 may also include PIN and password facilitator applications. In some embodiments, a facilitator application 112 may be a wallet SRT server.

The facilitator application servers 114 may be any suitable computing device that provides support for the facilitator applications 112. In some embodiments, the facilitator application server 114 may perform authentication processing on behalf of the facilitator application 112. For example, the facilitator application 112 may cause the client device 102 to obtain authentication data from a user of the client device 102. Once obtained, the authentication data may be transmitted to the facilitator application server 114 that corresponds to the facilitator application used to collect the authentication data. The authentication data may then be compared to authentication data on record for that user by the facilitator application server 114.

For an illustrative example of at least some embodiments of the disclosure, consider a scenario in which a user accesses a merchant (resource provider 104) website to complete a transaction (e.g., make a purchase). In this scenario, the user may, upon selecting a number of items for the transaction, be served a checkout page for the merchant website. The checkout page may include a list of the items, prices, quantities, or any other suitable transaction-related information. In addition, the checkout page may include a checkout element that may be selected to initiate a transaction. Once the checkout element has been selected, the user may be given the ability to select an account in order to complete the transaction.

In the scenario above, upon selection of the checkout element by the user of the client device 102, the communication application 106 at the client device 102 may be caused to initiate communication with the initiator server 208. This may involve the transmission of a number of transaction-related details from the client device 102 and communication application 106 to the initiator application server 108. In some embodiments, the client device 102 may also transmit user-identifying information to the initiator application server 108. For example, a helper feature in a browser application may provide user identifier information (e.g., via cookies). The initiator application server 108 may then identify the user associated with the transaction. If the initiator application server 108 is not able to identify the user based on the user-identifying information, then the user may be asked to self-identify (e.g., login).

Once a user has been identified by the initiator application server 108, the initiator application server 108 may send requests to a number of different SRT platforms 110 to identify accounts associated with the identified user. In some embodiments, a user may have several accounts with a SRT platforms 110 (e.g., across multiple issuers within the same transaction processing network). The initiator application server 108 may receive responses from each of the number of different SRT platforms 110 with a list of accounts associated with the user. Once received, the lists may be aggregated into a single list including each of the identified accounts.

Once an aggregated list of accounts has been created, it may be presented to the user via the communication application 106 (e.g., a browser application can activate a pop-up window) at the client device 102. In this scenario, the user may be presented with a number of different accounts belonging to him or her, with which the transaction should be completed. The user may then select one of the accounts from the list. Once this selection has been made, the communication application 106 at the client device 102 can transmit information about the selected account to the initiator application server 108 and onto the SRT platform 110 associated with the selected account.

Upon receiving a selection of an account to be used, the SRT platform 110 may identify a facilitator application capable of supporting the selected account. In some embodiments, the initiator application may identify a number of available facilitator applications 112 (1-M) installed on the client device 102 based on cookies stored on the client device 102. For example, each facilitator application 112 installed on the client device 102 may maintain a cookie in the memory of the client device 102. These cookies may include identifiers for the facilitator application 112 as well as graphics and/or icon images (e.g., card art). The initiator application server 108 may receive a list of these cookies from the client device 102 and may determine which, if any, of the facilitator applications on the list are capable of supporting the selected account. In some embodiments, this may be determined based on a level of trust associated with each of the facilitator applications. In some embodiments, this may also be determined based on the authentication processes utilized by the facilitator applications.

In some embodiments, once a list of supporting facilitator applications 112 has been generated, it may be presented to the user for selection. Upon receiving a selection of a particular facilitator application 112 from the list, the initiator application server 108 may provide that selection to the SRT platform 110 (e.g., the SRT platform that includes SRT server 110(A)(1), token data 110(6)(1) and processing network 110(C)(1). In some embodiments, a particular facilitator application 112 may be selected automatically. The SRT platform 110 may cause the selected facilitator application 112 to be executed in order to authenticate the user. The facilitator application 112 may then execute an authentication process and, upon completion of the authentication process, may return an authentication indicator that indicates whether or not the user is authenticated to the SRT platform 110.

Upon receiving an authentication indicator indicating that the user is authenticated, the SRT platform 110 may generate a transaction identifier to be associated with the requested transaction and selected account. The SRT platform 110 may provide the transaction identifier to the initiator application server 108, which may then provide the transaction identifier to the communication application 106 at the client device 102. Then, the communication application 106 at the client device 102 can provide the transaction identifier to the resource provider server 104 (e.g., via communications between a resource provider webpage accessed by the communication application 106 the resource provider server 104). The resource provider server 104 can subsequently transmit the transaction identifier back to the SRT platform 110, which may in turn generate a token to be associated with the requested transaction. The token may be mapped to the selected account via the token data 110(B). Once a token has been assigned to the transaction, the SRT platform 110 may provide the token to the resource provider server 104. The resource provider server 104 may subsequently use the received token to complete the requested transaction.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
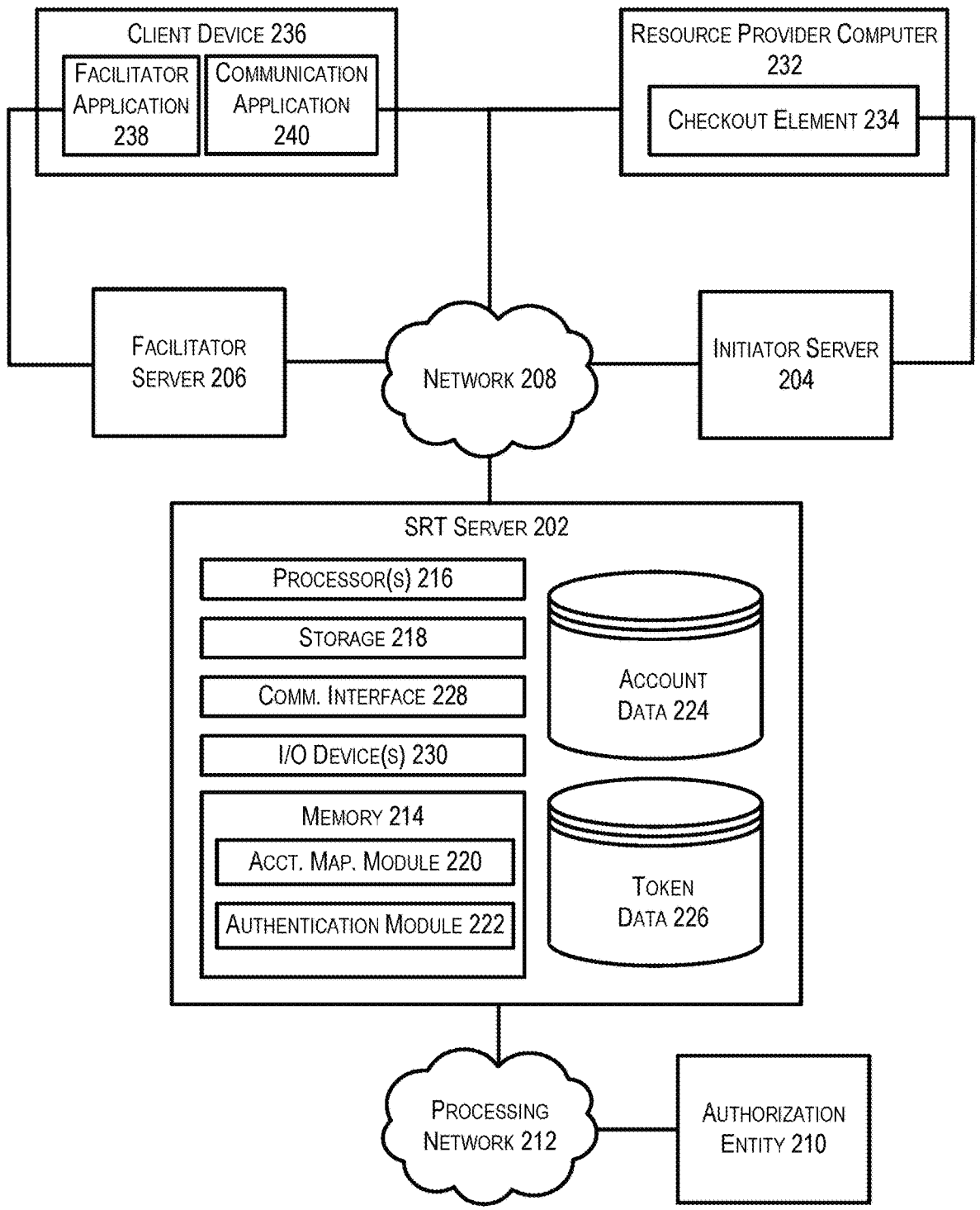
FIG. 2 depicts an example system architecture that may be implemented to provide secure remote transaction in accordance with embodiments of the disclosure.

FIG. 2 depicts an example system architecture that may be implemented to provide secure remote transaction in accordance with embodiments of the disclosure. In FIG. 2, a SRT server 202 may be in communication with a number of initiator servers 204 and facilitator servers 206 via a network connection 208. The SRT server 202 may also be in communication with a number of authorization entities 210 via a transaction processing network 212. In some embodiments, the SRT server 202 may be an example SRT server 110 of FIG. 1.

In at least some embodiments, the SRT server 202 may include at least one memory 214 and one or more processing units (or processor(s)) 216. The processor(s) 216 may be implemented as appropriate in hardware, computer-executable instructions, firmware or combinations thereof. Computer-executable instruction or firmware embodiments of the processor(s) 216 may include computer-executable or machine executable instructions written in any suitable programming language to perform the various functions described.

The memory 214 may store program instructions that are loadable and executable on the processor(s) 216, as well as data generated during the execution of these programs. Depending on the configuration and type of SRT server 202, the memory 214 may be volatile (such as random access memory (RAM)) and/or non-volatile (such as read-only memory (ROM), flash memory, etc.). The SRT server 202 may also include additional storage 218, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the SRT server 202. In some embodiments, the memory 214 may include multiple different types of memory, such as static random access memory (SRAM), dynamic random access memory (DRAM) or ROM.

Turning to the contents of the memory 214 in more detail, the memory 214 may include an operating system and one or more application programs or services for implementing the features disclosed herein including at least a module for identifying accounts, a module for generating transaction identifiers, a module for identifying accounts and/or transactions based on transaction identifiers, a module for generating tokens for a user (account mapping module 220), and a module for initiating authentication of a user via a facilitator application (authentication module 222). The memory 214 may also include account data 224, which provides data stored in association with a user account and/or token data 220, which provides a mapping between a generated token and a transaction or account.

In some embodiments, the account mapping module 220 may, in conjunction with the processor 216, be configured to receive an identifier from an initiator application and identify one or more accounts based on that identifier. In some embodiments, the account mapping module 220 may be provided with an identifier for a user, such as an email address or alias. In some embodiments, the account mapping module 220 may be provided with a device identifier. In at least some of these embodiments, the account mapping module 220 may communicate with the device associated with the device identifier to determine whether it has cookies stored in its memory which are associated with the SRT server 202. For example, the SRT server 202 may support a separate mobile application (e.g., the communication application) installed upon a user's client device 236 and that separate mobile application may generate a cookie to be stored upon the client device 236 to assist with login. In this example, the SRT Server, or the initiator server acting on the SRT server's behalf, may identify the cookies stored in memory of the client device and identify one or more accounts based on those cookies. In some embodiments, the cookies may include account reference identifiers (e.g., the last for digits of a PAN, a card display name, or other account metadata) which may be used to identify particular accounts.

In some embodiments, the authentication module 222 may, in conjunction with the processor 216, be configured to receive an indication that a transaction is to be conducted with respect to a particular account and may cause a user associated with the transaction to be authenticated. To do this, the authentication module 222 may identify one or more facilitator applications 238 and/or authentication techniques associated with the identified account. In some cases, this may involve determining what facilitator applications 238 have been used with the account in the past. In some cases, this may involve receiving account authentication requirements from an authorization entity 210 associated with the account (e.g., an issuer) that indicate which facilitator applications 238 and/or authentication techniques are suitable for use with the account. In some embodiments, the authentication module 222 may compile a list of suitable facilitator applications, which it may provide to the client device 236 via the initiator server. In these embodiments, the user may be given the ability to select an appropriate facilitator application 238 from the list of facilitator applications. In some embodiments, the authentication module 222 may select a most-appropriate facilitator application 238 from the available facilitator applications. For example, in some embodiments, each facilitator application may be associated with a level of trust. The authentication module 222 may select the facilitator application associated with the highest level of trust. In some embodiments, the authentication module 222 may select a default facilitator application 238 if it is available. Once the facilitator application 238 has been selected, the SRT server 202 may communicate with a facilitator server 206 associated with that facilitator application 238. The facilitator server 206 may then cause the facilitator application 238 installed on the client device 236 to be executed in order to authenticate the user of the client device 236. Upon receiving an indication that the user has been authenticated, the facilitator server 206 may provide that indication to the authentication module 222. In some embodiments, the authentication module 222 may also receive an indication of additional information to be associated with the transaction. For example, the authentication module 222 may receive shipping information for the transaction from the facilitator server 206.

In some embodiments, the account mapping module 220 may, in conjunction with the processor 216, be further configured to generate a transaction identifier and/or a token to be used in the transaction. Once the account mapping module 220 has received an indication from the authentication module 222 that a user has been authenticated, the account mapping module 220 may generate a transaction identifier that can be used by the resource provider computer 232 to reference the transaction and/or selected account. The transaction identifier can be provided to the communication application 240 at the client device 236 (e.g., via the initiator server 204), which can forward the transaction identifier to the resource provider computer 232. The resource provider computer 232 can then communicate with the SRT Server 202 to exchange the transaction identifier for a token. For example, the SRT Server 202 may generate a token to be used by the resource provider computer 232 to complete the transaction. In some embodiments, the token may be a one-time use token which is only authorized for use with the specific transaction at issue. In some embodiments, the token may be specific to both the client device 236 and the resource provider computer 232, in that the token may be used multiple times by the resource provider computer 232 for that client device 236. For example, upon conducting with a particular client device 236 for the first time, the resource provider computer 232 may receive a token generated in the manner described herein. The resource provider computer 232 may then store the token in memory for use with the client device 236 until an expiration date (or some other suitable expiration condition) associated with that token. The account mapping module 220 may store the generated token in a token vault (e.g., token data 226) with a mapping to the account for which the token was generated. Upon receiving an authorization request message that includes the token, the SRT server 202 may query the token vault to identify the account associated with the token. The SRT server 202 may then proceed with the transaction of the authorization request message using the identified account information.

The SRT server 202 may also contain communications interface(s) 228 that enable the SRT server 202 to communicate with a stored database, another computing device or server, one or more remote devices, other application servers, and/or any other suitable electronic devices. In some embodiments, the communication interface 228 may enable the SRT server 202 to communicate with other electronic devices on a network (e.g., on a private network). The SRT server 202 may also include input/output (I/O) device(s) and/or ports 230, such as for enabling connection with a keyboard, a mouse, a pen, a voice input device, a touch input device, a display, speakers, a printer, etc.

In some embodiments, the initiator server 204 may include a server device configured to conduct transactions between one or more resource provider computers 232 and one or more SRT servers 202. In some embodiments, the initiator server 204 may be configured to provide functionality for a checkout element 234 implemented via a checkout page. In some embodiments, resource provider computer 232 may host or otherwise maintain an online webpage or mobile application in order to provide access to various resources. In these embodiments, a checkout element embedded into the online webpage or mobile application may direct a user that selects the checkout element to a separate pop-up window (e.g., provided by the initiator server 204) in a browser application, or to a separate application (i.e., an initiator application) executed by the initiator server 204. Upon execution of the initiator application or pop-up browser webpage, the initiator server may perform at least a portion of the functionality described herein.

In some embodiments, the facilitator server 206 may include a server device in communication with a client device 236. The facilitator server 206 may be configured to provide back end support for a facilitator application 238 installed upon the client device 236. The client device 236 may be any electronic device capable of communicating with the resource provider 232 and any other entity. For example, the client device 236 may be a mobile phone capable of wirelessly communicating with other electronic devices. In some embodiments, the facilitator application 238 may be a mobile application installed upon, and executed from, the client device 236. Additionally, a communication application 240 can installed upon, and executed from, the client device 236. The communication application 240 can enable the client device 236 to communicate with the resource provider computer 232. For example, the communication application 240 can include a web browser application that can access a resource provider website and otherwise communicate with the resource provider computer 232. Alternatively, the communication application 240 can include a shopping application, an application interface, and/or any other suitable software capable of communicating with the resource provider computer 232, initiator server 204, facilitator server 206, and/or SRT server 202. In some embodiments, the facilitator application 238 can be part of the communication application 240.

Figure 3:
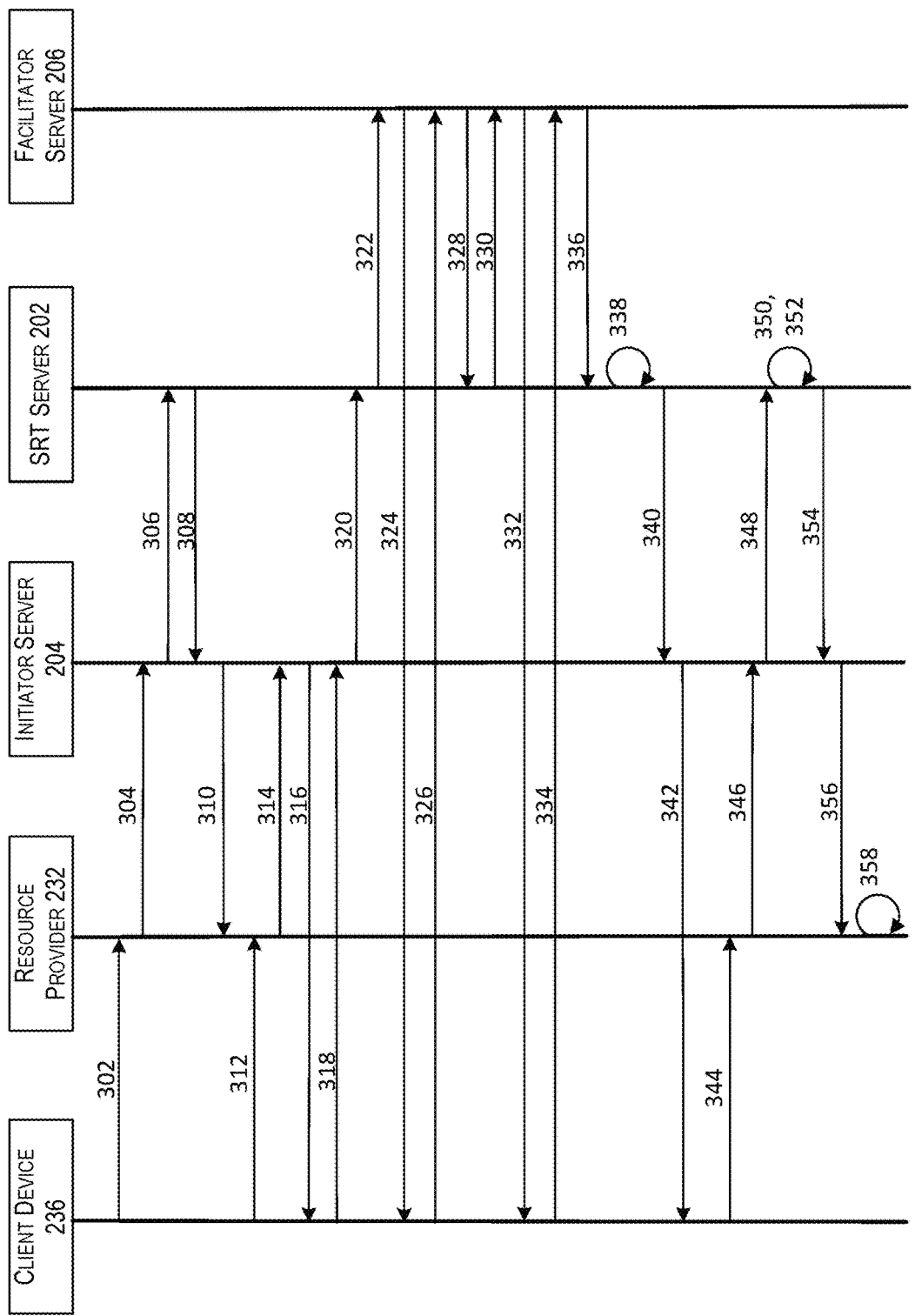
FIG. 3 depicts a swim lane diagram which illustrates an example process for conducting a transaction using a SRT platform in accordance with at least some embodiments.

FIG. 3 depicts a swim lane diagram which illustrates an example process for conducting a transaction using a SRT platform in accordance with at least some embodiments. Depicted in FIG. 3 are interactions between various components as described herein. In particular, the process 300 depicts interactions between a client device 236, a resource provider 232, an initiator server 204, a SRT server 202, and a facilitator server 206.

Process 300 may begin at 302, when a user uses a communication application (e.g., a web browser application, a shopping application, an application interface, etc.) on the client device 236 to visit a checkout page (e.g., an electronic shopping cart) associated with a resource provider. In some embodiments, the user may select a number of resources (e.g., goods and/or services) provided by an electronic retailer. Once the user has selected a number of resources, the user may select an option to complete a transaction for the resources and may be provided with a checkout page.

On the checkout page, the resource provider may display an embedded checkout element at 304. In some embodiments, when a user visits a checkout page with an embedded checkout element, the initiator may determine whether or not the user is a recognized user. To do this, the initiator may receive user-identifying information from the communication application, from the resource provider, and/or from software (e.g., the checkout element) embedded within the checkout page. In some embodiments, when the user visits a checkout page or selects the checkout element on a resource provider checkout page, that user's email address may be transmitted by the browser (e.g., via a helper feature) to the initiator server. In the scenario in which the initiator server 204 is able to obtain an identifier (e.g., an email address) for the user, the initiator server 204 may transmit that identifier to a number of different SRT servers 202 which support the initiator server 204 at 306. The SRT servers 202, upon receiving the user-identifying information, may each determine whether or not an authorization entity associated with the SRT server maintains at least one account associated with that user. In some embodiments, this may involve the SRT server querying a number of authorization servers. In some embodiments, each of the SRT servers 202 may maintain mappings between various accounts and identifiers. In these embodiments, the SRT servers 202 may each query a database that it maintains in order to identify a list of accounts based on the identifier. Upon identifying a number of accounts, the SRT server may return a list of those accounts to the initiator server 204 at 308. If the SRT server has not been able to identify any accounts associated with the identifier, then the SRT server may return an indication that the user is not recognized. In some embodiments, the initiator server 204 may cause the checkout element to display a checkout button once the initiator server 204 has received responses from the SRT servers to which the requests were sent (whether or not the user is recognized) at 310.

At 312, the user may initiate a transaction with the resource provider via the checkout page by selecting the checkout button displayed by the communication application on the client device 236. Upon detecting that the checkout button has been selected, the resource provider 232 (e.g., or a browser application accessing a resource provider webpage) may send information to the initiator server 204 to initiate a transaction at 314. For example, the resource provider 232 may send information related to one or more resources to be obtained by the user as well as a total cost or any other suitable information. It should be noted that these steps may be performed before, after, or concurrently with steps 306 and 308.

In the scenario in which the user's email address is unable to be obtained from the browser, the user may be asked to enter his or her email address. The initiator server may then identify that user's accounts from the file including the mapping of the accounts to the user's email address. In some embodiments, if the initiator server is unable to identify an account from the mapping file, then the user may be asked to provide an account identifier. The initiator may perform more or more authentication techniques in order to confirm that the user is actually in possession of a provided email address. For example, in some embodiments, the initiator server may send a one-time password (e.g., a code or pin) to the email address, which the initiator may require that the user provide back. The SRT server may then query the SRT servers in the manner described above to identify a number of accounts available for a user.

Once the initiator server 204 has identified a user and a list of accounts associated with that user, the initiator server 204 may provide the list of accounts to the communication application on the client device at 316. The initiator server 204 may enable the user to select a specific account from the list of accounts to be used to complete the transaction. The communication application at the client device 236 can then provide information about the user's selected account to the initiator server 204 at 318. Upon receiving this selection, the initiator server 204 may identify the SRT server associated with the selected account. The initiator server 204 may generate and transmit a request to the appropriate SRT server 202 at 320. In some embodiments, the request may include details of the transaction to be conducted. It should be noted that each account is associated with only one SRT server 202 whereas a single SRT server 202 may be associated with multiple accounts.

Once the request has been received by the SRT server and the user for the transaction has been identified, account information stored by the SRT server 202 may be identified with respect to that user. For example, the user may be associated with one or more client devices, a shipping address, a billing address, or any other suitable user-related information. In some embodiments, the user may be associated with a default client device that may be selected automatically. Once the account information has been identified, the user may be asked to authenticate himself or herself using a separate authentication process 206. It should be noted that the authentication process 206 may be separate from any login required in user identification process 204. In some embodiments, if this is the first time that the user has utilized a particular account with a particular browser application, the user may be required to perform one or more extra steps to confirm his or her identity (e.g., a IDD process). Once this is done, the user's identity may be securely bound to the user's identity within the browser.

The SRT server, upon identifying the account selected by the user, may determine one or more facilitator applications available to provide authentication for the account. In some embodiments, a list of facilitator applications appropriate for authenticating a user with respect to a particular account may be provided to the SRT server by an authorization entity that maintains the account. In some embodiments, one or more capabilities of the facilitator application may be identified based at least in part on a level of trust associated with the facilitator applications. In some embodiments, one or more facilitator applications may be selected based on authentication capabilities available via the facilitator applications. For example, a list of facilitator applications may be selected that provide fingerprint authentication. In some embodiments, the SRT server 202 may provide the list of facilitator applications to the user for the user to elect a preferred facilitator application. In some embodiments, the SRT server 202 may select an appropriate facilitator application from the list of available facilitator applications. In some embodiments, the appropriate facilitator application may be selected based on one or more attributes of the facilitator application.

Once the SRT server 202 has received an indication of an appropriate facilitator application to be used in the transaction, the SRT server 202 may transmit a request to the facilitator server 206 associated with that facilitator application at 322. In some embodiments, the SRT server 202 may transmit at least a portion of the transaction information to the facilitator server 206.

Upon receiving the request to authenticate the user for the transaction, the facilitator server 206 may provide instructions to a facilitator application installed on the client device 236 at 324. In some embodiments, the instructions may be provided to the facilitator application via a push notification. The instructions may cause the facilitator application to be executed upon the client device in order to authenticate the user. Upon execution, the facilitator application may perform the requested authentication process. In some embodiments, this may involve causing the client device 236 to obtain biometric or other user-specific information from the user. The obtained user-specific data may then be compared to user-specific data stored by the facilitator application. The user may be authenticated if the obtained user-specific information matches the stored user-specific information to some predetermined extent.

Once the user has been authenticated by the facilitator application using the authentication process, the facilitator application may transmit an indication that the user has been authenticated to the facilitator server 206 at 326. In some embodiments, the authentication process may be performed by the facilitator server 206 as opposed to the facilitator application executed on the client device 236. For example, upon execution, the facilitator application may obtain user-specific information and may transmit that user-specific information to the facilitator server 206. Upon the facilitator server 206 determining that the user is authenticated, the facilitator server 206 may communicate the user's authenticity to the SRT server at 328.

In some embodiments, the SRT server may maintain supplemental information related to a user. For example, the SRT server 202 may maintain one or more shipping addresses associated with the user. In at least some of these embodiments, the SRT server 202 may select a set of supplemental information to be provided to the initiator server 204 (i.e., a default shipping address). In some embodiments, the SRT server may request some set of supplemental information from the user. For example, the SRT server 202 may transmit a request to the facilitator server 206 for supplemental information at 330. The facilitator server 206 may, in some embodiments, present one or more options to a user at 332. For example, the SRT server 202 may request shipping information from the facilitator server 206 at 330. The facilitator server 206 may, in turn, identify a number of shipping addresses available to the user. Once identified, the facilitator server 206 may present the number of shipping addresses to the client device 236 for presentation to the user at 332 via the facilitator application. The user may then select a shipping address to be associated with the transaction. The user's selection may be communicated back to the facilitator server 206 at 334 and subsequently to the SRT server 202 at 336.

In some embodiments, once some or all of the above steps are completed (e.g., account selection, user authentication, address selection), the method can proceed with steps for providing a token to the resource provider 232. However, the SRT server 202 may not respond immediately with a token. Instead, in some embodiments, the SRT server 202 can provide a transaction identifier which the resource provider 232 can subsequently use to obtain a token through a different communication channel. This can advantageously create a more direct and secure channel for transmitting the token, and can prevent the token from being exposed to intermediary entities (e.g., the communication application).

In some embodiments, the SRT server 202 can receive a specific request for a transaction identifier and/or account credentials associated with the account selected by the user. In some embodiments, this request can be the request sent at step 320 by the initiator server 204 (e.g., after the communication application executed on the client device 236 sends the user's account selection to the initiator server 204 at step 318). In other embodiments, the communication application on the client device 236 can send the request directly to the SRT server 202. A request for account credentials can include an account reference ID (e.g., the last for digits of a PAN, a card display name, encrypted account credentials), a wallet account identifier, a client device identifier, verification data, a shipping address or address display name, a resource provider identifier, and/or any other suitable information.

At step 338, the SRT server 202 can generate a transaction identifier that is associated with the account and/or this specific transaction. The transaction identifier can be any suitable data value, such as an alphanumeric code. The SRT server 202 can also create and store a record in the database, the record indicating that the transaction identifier is associated with the selected account. The record can also include the selected address, an indication that authentication was completed for the transaction and account, a resource provider identifier associated with the resource provider 232 that is authorized to obtain account credentials, and/or any other suitable information.

At step 340, the SRT server 202 can transmit the transaction identifier to the initiator server 204. The message with the transaction identifier can also include the account reference ID (e.g., last four digits of the PAN), transaction-specific data, and/or any other suitable information.

At step 342, the initiator server 204 can transmit the transaction identifier and other accompanying information from step 340 to the communication application at the client device 236.

At step 344, the communication application can then forward the transaction identifier and other accompanying information to the resource provider 232. As a result, the communication application executed on the client device 236 may view the transaction identifier, but the communication application may not view or handle more sensitive information, such as account credentials (e.g., a token). Some of these communication steps are shown in more detail in FIG. 4.

In some embodiments, at this point, the resource provider 232 can confirm the transaction details and selected account with the user. For example, the resource provider 232 can transmit the transaction amount, the items for purchase, an account reference ID (e.g., the last for digits of a PAN, a card display name, or other account metadata), and any other suitable information to the communication application (e.g., a web browser application, a shopping application, an application interface, etc.) at the client device 236. The user can review the transaction data, and can click a button to confirm the transaction and execute the purchase.

At step 346, the resource provider 232 can generate and transmit a request for account credentials to a server computer (e.g., the initiator server 204 or the SRT server 202). The request can include the transaction identifier. The request can further include any other suitable information, such as a resource provider identifier, an account reference ID (e.g., the last 4 digits of a primary account number), an authentication result, and/or an address. This request can be sent through a new (or second) communications channel. For example, the request can be sent directly to the initiator server 204 without passing through the communication application or client device 236. Then, at step 348, the initiator server 204 can forward the request to the SRT server 202.

At step 350, the SRT server 202 can identify the selected account based on the received transaction identifier. For example, in some embodiments, the SRT server 202 can look up the database record based on the transaction identifier, and identify the account associated with the transaction identifier in the record.

Additionally, in some embodiments, the SRT server 202 can verify that the resource provider 232 is authorized to receive account credentials. For example, the SRT server 202 can verify that a resource provider identifier received in the request matches a resource provider identifier stored in the record. In some embodiments, user authentication (e.g., steps 324 and 326) can optionally take place at this point.

At step 352, the SRT server 202 can obtain account credentials, such as a token, for the account. In some embodiments, obtaining a token can include generating a new token (e.g., a randomly generated string of characters) which may be mapped to the selected account in a token vault. In other embodiments, obtaining a token can include identifying an existing token that already mapped to the selected account in a token vault. In some embodiments, steps 350 and 352 can be combined into a single step of identifying an existing token based on the transaction identifier.

Then, the SRT server 202 can transmit the token to the resource provider 232 along with any other suitable information (e.g., an expiration date, cryptogram, shipping address, billing address, verification data, ecommerce indicator, an account reference ID, the transaction identifier). This transmission can take place by the SRT server 202 sending the token to the initiator server 204 at step 354, and then the initiator server 204 sending the token to the resource provider 232 at step 356. As a result, the token can be transmitted to the resource provider 232 through the second communication channel, thereby avoiding exposing the token (and/or other account credentials) to the communication application and client device 236.

At step 358, the resource provider 232 can use the token for the transaction and/or store the token for future use. In some embodiments, the resource provider 232 may complete the transaction by submitting an authorization request message including the token, the transaction amount, and a resource provider identifier to the processing network (e.g., processing network 110(C)(1)) via an acquirer computer (not shown). The processing network may determine a real account identifier (e.g., a PAN or primary account number) associated with the token, and may generate a modified authorization request message including the real account identifier to an authorizing entity computer operated by an authorizing entity such as an issuer. The authorizing entity may approve or deny the request, and may generate an authorization response message including the authorization decision. The authorization response message may be transmitted back to the processing network, and the processing network may substitute the token for the real account identifier in the authorization response message. The modified authorization response message may then be transmitted back to the resource provider. At the end of the day or any other suitable period of time, a clearing and settlement process may take place between the acquirer and the authorizing entity, via the processing network.

Figure 4:
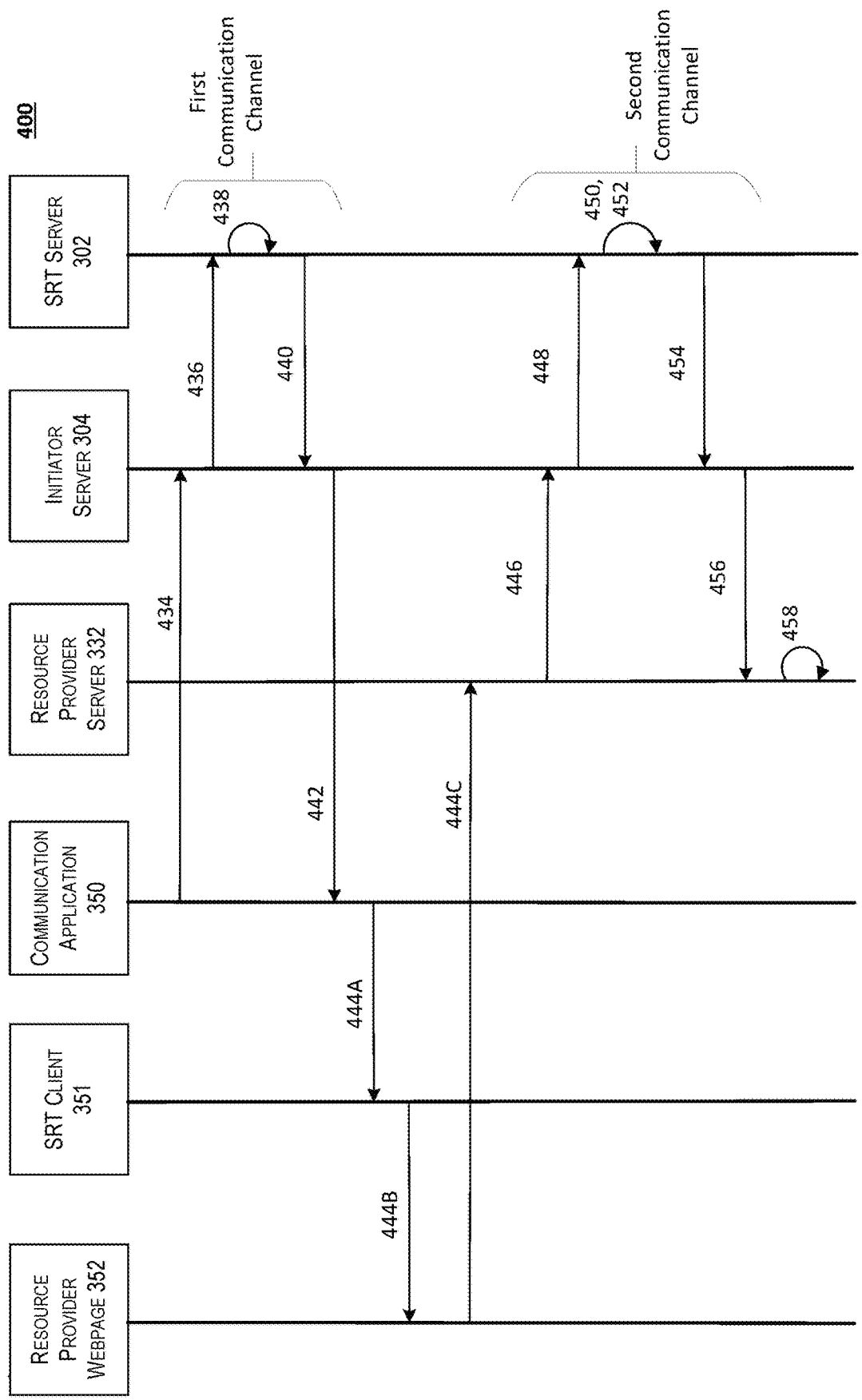
FIG. 4 depicts a swim lane diagram which illustrates an example process for communicating a transaction identifier in accordance with at least some embodiments.

The flow 400 in FIG. 4 shows another embodiment of the steps for providing account credentials. The steps in the flow 400 are analagous to steps 318 and 338-358 in FIG. 3, but with a more detailed series of communications. In FIG. 4, the SRT Server 302 can be similar to or the same as the SRT Server 202 in FIG. 3, the initiator server 304 can be similar to or the same as the initiator server 204 in FIG. 3, and the resource provider server 332 can be similar to or the same as the resource provider 232 in FIG. 3. Additionally, in some embodiments, the communication application 350, the SRT client 351, and the resource provider webpage 352 can represent various software being executed by the client device 236 of FIG. 3, by a cloud computer server, or by any other suitable device. These separate software components are shown to demonstrate how a transaction identifier can be received by the client device from the SRT Server 302, and then internally passed and prepared for sending to the resource provider server 332.

The flow 400 does not show all of the steps for selecting a checkout button, gathering account information, selecting an account, authenticating a user, selecting an address, etc. However, some or all of these steps can take place before the flow 400. For example, some or all of steps 302-336 can take place before the flow 400 begins. Additionally, embodiments allow the account selection, authentication, order confirmation with the user, etc., to take place in any suitable order before or after the account credentials are requested.

As mentioned above, in some embodiments, a communication application 350 (e.g., a web browser application, a shopping application, an application interface, etc.) can be executed on the client device. The resource provider webpage 352 can represent a webpage being accessed by the communication application 350 and displayed by the client device. In some embodiments, the SRT client 351 can include a software add-on or extension that is incorporated into the communication application 350. The SRT client 351 can be configured to communicate with initiator server and/or one or more SRT servers. In some embodiments, the communication application 350 can invoke the SRT client for communicating with the initiator server when the user clicks on a checkout button or access a checkout webpage. In further embodiments, the SRT client can be a separate application installed on the client device. The SRT client 351 can include instructions that cause the communication application 350 to load another webpage (e.g., a pop-up window) that allows the user to select an account and/or address for a transaction, and instructions to communicate the selections to the intiator server 304.

In some embodiments, the steps for identifying accounts and selecting an account for a transaction can primarily take place between the communication application 350 (and/or SRT client 351) being executed by the client device and the initiator server 304. The resource provider server 332 may perform some communications with the client device to provide access to the resource provider webpage, but the resource provider server 332 may not interact with the SRT server 302 until it is time to obtain account credentials. The steps below provide more information about how the communication flow between the communication application 350 (e.g., as executed on the client device) and the SRT server 302 transitions into a communication flow between the resource provider server 332 and the SRT server 302.

At step 434, which can be similar to step 318 in FIG. 3, the communication application 350 (and/or SRT client 351) on the client device can generate and transmit an account selection message to the initiator server 304. The message can include a request for a transaction identifier and/or account credentials associated with an account selected by the user. The request can include an account reference ID (e.g., the last for digits of a PAN, a card display name, encrypted account credentials), a wallet account identifier, a client device identifier, verification data, a shipping address or address display name, a resource provider identifier, and/or any other suitable information. Then, at step 436, the initiator server 304 can forward the request for the transaction identifier to an SRT server 302 that is associated with the selected account. In some embodiments, the communication application 350 can send the request directly to the SRT server 302.

At step 438, which can be similar to step 338 in FIG. 3, the SRT server 302 can generate a transaction identifier that is associated with the account and/or this specific transaction. The SRT server 302 can also create and store a record in the database, the record indicating that the transaction identifier is associated with the selected account. The record can also include the selected address, an indication that authentication was completed for the transaction and account, a resource provider identifier for the resource provider that is authorized to obtain account credentials, and/or any other suitable information.

At step 440, which can be similar to step 340 in FIG. 3, the SRT server 302 can transmit the transaction identifier to the initiator server 304. The message with the transaction identifier can also include the account reference ID (e.g., the last for digits of a PAN, a card display name, or other account metadata), transaction-specific data, and/or any other suitable information.

At step 442, the initiator server 304 can transmit the transaction identifier (and other accompanying information from step 440) to the communication application 350 being executed by the client device.

Then, steps 444A-444C demonstrate several of the communications that can be encompassed by step 344 in FIG. 3. For example, at step 444A, the communication application 350 can then provide the transaction identifier and other accompanying information to the SRT client 351. For example, the message from the initiator server 304 at step 442 may have been addressed to the SRT client 351 via the communication application 350, so the communication application 350 can forward the transaction identifier as specified.

Then, at step 444B, the SRT client 351 can provide the transaction identifier and other accompanying information to the resource provider webpage 352 (e.g., being executed by a browser application on the client device 236). For example, the SRT client 351 may have been activated because a user has accessed a checkout webpage. Accordingly, the SRT client 351 may be linked with the checkout webpage, and may be configured to pass the transaction identifier to the checkout webpage upon receipt.

Finally, at step 444C, the resource provider webpage 352 can provide the transaction identifier and other accompanying information to the resource provider server 332. For example, the resource provider webpage 352 (e.g., which can be a page shown by the communication application) may automatically transmit any information it receives to the resource provider server 332. In some embodiments, the SRT client 351 and/or communication application 350 can directly transmit the transaction identifier to the resource provider server 332 upon receipt.

Thus, the transaction identifier can be transmitted from the communication application 350 to the resource provider server 332. The steps 444A-444C are one example of transmitting the transaction identifier from the communication application 350 to the resource provider server 332. Embodiments allow additional or less communications steps to be included, and the transaction identifier can be transmitted through any suitable chain of applications and software layers. For example, in one alternative, the communication application 350 can transmit the transaction identifier directly to the resource provider webpage 352, instead of through the SRT client 351.

Accordingly, the transaction identifier can be obtained from the SRT server 302 through a first communication channel involving the communication application 350 and client device, and then the transaction identifier can then be provided to the resource provider server 332 so that the resource provider server 332 can exchange the transaction identifier for the account credentials at the SRT server 302 through a second communication channel. As a result, the communication application 350 and client device may view the transaction identifier, but may not view or handle more sensitive information, such as account credentials (e.g., a token).

In some embodiments, at this point, the resource provider server 332 can confirm the transaction details and selected account with the user. For example, the resource provider server 332 can transmit the transaction amount, the items for purchase, an account reference ID (e.g., the last for digits of a PAN, a card display name, or other account metadata), and any other suitable information to the communication application 350 at the client device. The user can review the transaction data, and can click a button to confirm the transaction and execute the purchase.

At step 446, which can be similar to step 346 in FIG. 3, the resource provider server 332 can generate and transmit a request to the initiator server 304 for account credentials. The request can include the transaction identifier. The request can further include any other suitable information, such as a resource provider identifier, an account reference ID (e.g., the last 4 digits of a primary account number), an authentication result, and/or an address. This request can be sent through a new (or second) communication channel. For example, the request can be sent directly to the initiator server 304 without passing through the communication application 350 or client device.

At step 448, which can be similar to step 348 in FIG. 3, the initiator server 304 can forward the request to the SRT server 302.

At step 450, which can be similar to step 350 in FIG. 3, the SRT server 302 can identify the selected account based on the received transaction identifier. For example, in some embodiments, the SRT server 302 can look up the database record based on the transaction identifier, and identify the account associated with the transaction identifier in the record.

Additionally, in some embodiments, the SRT server 302 can verify that the resource provider server 332 is authorized to receive account credentials. For example, the SRT server 302 can verify that a resource provider identifier received in the request matches a resource provider identifier stored in the record. In some embodiments, user authentication can optionally take place at this point.

At step 452, which can be similar to step 352 in FIG. 3, the SRT server 302 can obtain account credentials, such as a token, for the account. In some embodiments, obtaining a token can include generating a new token (e.g., a randomly generated string of characters) which may be mapped to the selected account in a token vault. In other embodiments, obtaining a token can include identifying an existing token that already mapped to the selected account in a token vault. In some embodiments, steps 450 and 452 can be combined into a single step of identifying an existing token based on the transaction identifier.

Then, the SRT server 302 can transmit the token to the resource provider server 332 along with any other suitable information (e.g., an expiration date, cryptogram, shipping address, billing address, verification data, ecommerce indicator, an account reference ID, the transaction identifier). This transmission can take place by the SRT server 302 sending the token to the initiator server 304 at step 454 (which can be similar to step 354 in FIG. 3), and then the initiator server 304 sending the token to the resource provider server 332 at step 456 (which can be similar to step 356 in FIG. 3). As a result, the token can be transmitted to the resource provider server 332 through the second communication channel, thereby avoiding exposing the token (and/or other account credentials) to the communication application 350 and client device.

At step 458, which can be similar to step 358 in FIG. 3, the resource provider 232 can use the token for the transaction and/or store the token for future use. In some embodiments, the resource provider server 332 may complete the transaction by submitting an authorization request message including the token, the transaction amount, and a resource provider identifier to the processing network (e.g., processing network 110(C)(1)) via an acquirer computer (not shown). The processing network may determine a real account identifier (e.g., a PAN or primary account number) associated with the token, and may generate a modified authorization request message including the real account identifier to an authorizing entity computer operated by an authorizing entity such as an issuer. The authorizing entity may approve or deny the request, and may generate an authorization response message including the authorization decision. The authorization response message may be transmitted back to the processing network, and the processing network may substitute the token for the real account identifier in the authorization response message. The modified authorization response message may then be transmitted back to the resource provider server 332. At the end of the day or any other suitable period of time, a clearing and settlement process may take place between the acquirer and the authorizing entity, via the processing network.

The above flows described the client device including an application for communicating with other computers, and for allowing the user to select items for purchase, an account, an address, etc. As mentioned above, the application can take the form of a web browser application, a shopping application (e.g., a generic shopping application or a merchant-specific application), portions of an operating system such as an API, cloud-based transaction software, and/or any suitable combination of programs.

Additionally, embodiments of the invention allow the token providing process to similarly take place even after a different account-selection flow. For example, in some embodiments, the communication application can store account reference identifiers (e.g., the last for digits of a PAN, a card display name) that have been collected from SRT servers during a previous transaction. Thus, the communication application (and/or SRT client) can display the account options without having to repeat the queries for each SRT server. Then, the communication application can initiate the token obtaining process by transmitting a request for account credentials associated with the selected account.

Further, in the flows 300 and 400, most communications to the SRT server are routed through the initiator server. However, in some embodiments, messages (e.g., from the communication application, client device, and/or resource provider server) can be transmitted directly to the SRT server without having to pass through the initiator server. For example, when the resource provider server exchanges the transaction identifier for the account credentials (e.g., token), the resource provider server may be able to send a message directly to the SRT server, instead of indirectly to the SRT server via the initiator server. Similarly, the SRT server can respond by sending the account credentials directly to the resource provider server, instead or indirectly to the resource provider server via the initiator server. In such an embodiment, the account credentials would advantageously not be shown to the initiator server.

The methods above described using a transaction identifier (e.g., an alphanumeric string) to link a first communication channel with a second communication channel such that a resource provider can obtain a token. In some embodiments, the same goal can be achieved using an encrypted set of account credentials instead of using a transaction identifier that is a random value. For example, the encrypted payment data can include a token, expiration date, cryptogram, shipping address, billing address, verification data, and/or any other suitable information. This encrypted data can be passed to the communication application and client device, and then to the resource provider. The resource provider can exchange the encrypted data for the token (e.g., similar to the process described above for the transaction identifier). Further, in some embodiments, the resource provider server or initiator server may be able to decrypt the encrypted data, such that the resource provider server does not need to contact the SRT Server 302 to obtain the account credentials.

In further embodiments, the communication application 350 can be integrated with the resource provider server 332.

Figure 5:
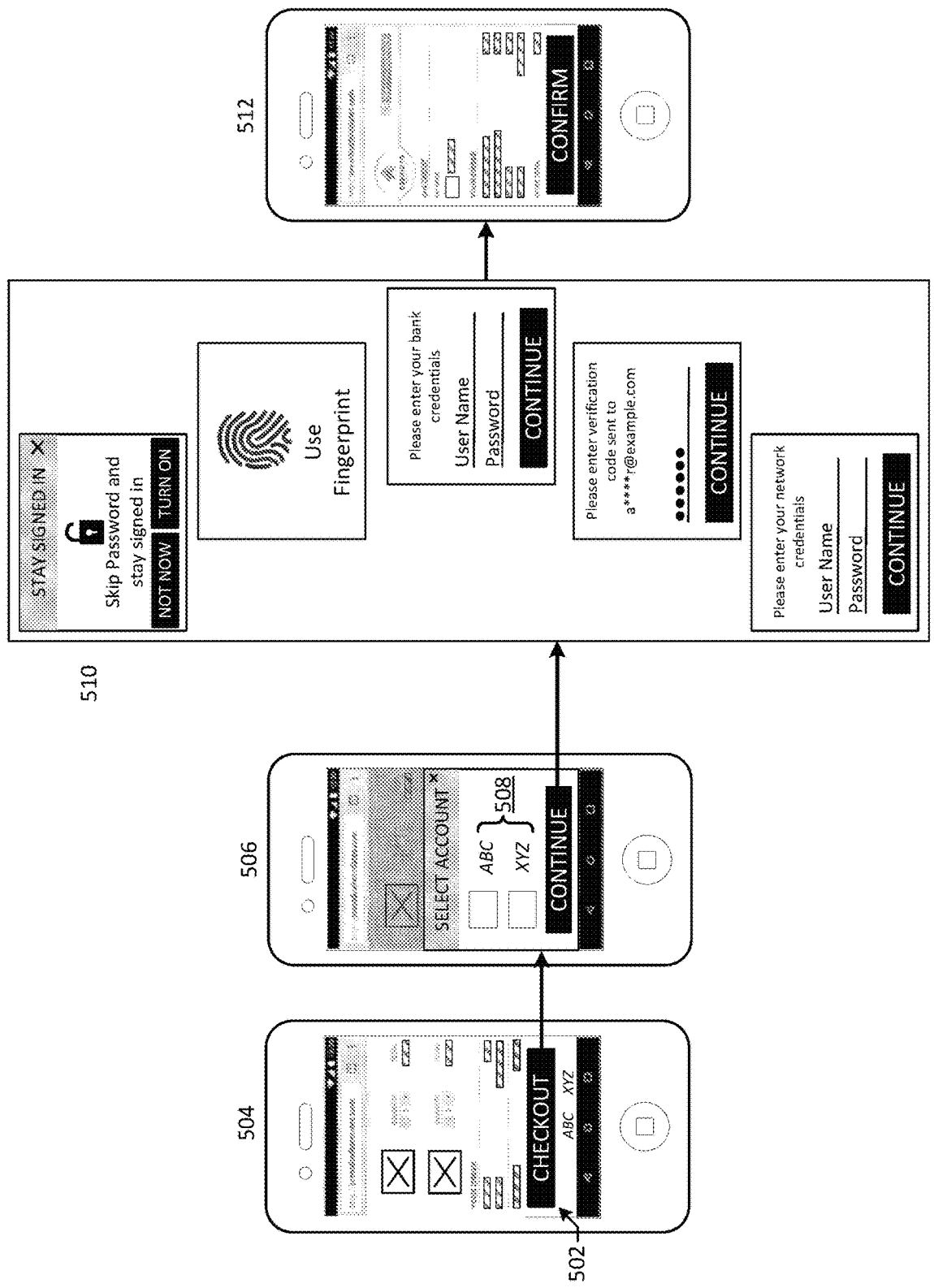
FIG. 5 depicts a process for authenticating a user in accordance with embodiments of the disclosure.

FIG. 5 depicts a process for authenticating a user in accordance with embodiments of the disclosure. In FIG. 5, a communication application (e.g., a web browser application, a shopping application, an API, etc.) on a client device can display a checkout graphical user interface (GUI) 504 having a resource provider's checkout page with a checkout element 502. When a user selects the checkout element 502, the communication application can identify the user and load a pop-up window with an account selection GUI 506 (e.g., provided by an SRT client that is an extension of the browser). The account selection GUI 506 can contain a list of available accounts 508 for that user. As described herein, the user may be identified by an initiator server by querying a number of SRT servers supporting that initiator server.

In some embodiments, an account presentation space within the list of available accounts 508 may be at least partially customizable by an authorization entity. For example, the authorization entity may be provided with a format for an account presentation space associated with an account in the list of accounts and the authorization entity may be free to fill that space as it wishes. In some embodiments, data provided in the account presentation space may be dynamic (e.g., determined at the time of the transaction) or static. In some embodiments, the information provided in the account presentation space may vary based on the user or transaction. For example, the authorization entity may provide a different graphic for an account based on a status that the user has with that authorization entity (e.g., silver member, gold member, or platinum member).

Based on the user's selection of an account from the list of accounts 508, the user may be presented with a number of authentication options 510 capable of providing authentication for the selected account. The authentication options 510 may be provided based on capabilities of the initiator and/or the facilitator application installed upon the client device. Some examples of authentication options include enabling a user to stay logged into an account. In some embodiments, this may involve storing a cookie on the client device that enables the initiator to quickly identify the user and retrieve a transaction identifier and/or token previously generated for that user. In some embodiments, this may require that the user first be authenticated using a different authentication technique, but may enable quick authentication in future transactions. A second example of an authentication option may be the use of biometric information (e.g., a fingerprint scan) by the user. A third authentication option may include the user logging into an account maintained by an authorization entity associated with the account using proper login credentials. Another authentication option may include the use of a one-time passcode provided to a channel that the user has access to (e.g., email or text message). Yet another authentication option may include the user logging into an account maintained by a transaction processing network associated with the account using proper login credentials. Although some specific examples have been provided, these illustrated examples are not intended to be limiting. It should be noted that one skilled in the art would recognize that a number of alternative authentication options may be available to a user for authenticating an account.

The user may then select an authentication option 510 and may be authenticated in accordance with that selected authentication option. Once authenticated, the resource provider may be provided with a token (e.g., via a transaction identifier as discussed above) to complete the transaction and the user may be given an opportunity to confirm the transaction via a confirmation GUI 512 as well as select a shipping address or other information to be included in the transaction.

Figure 6:
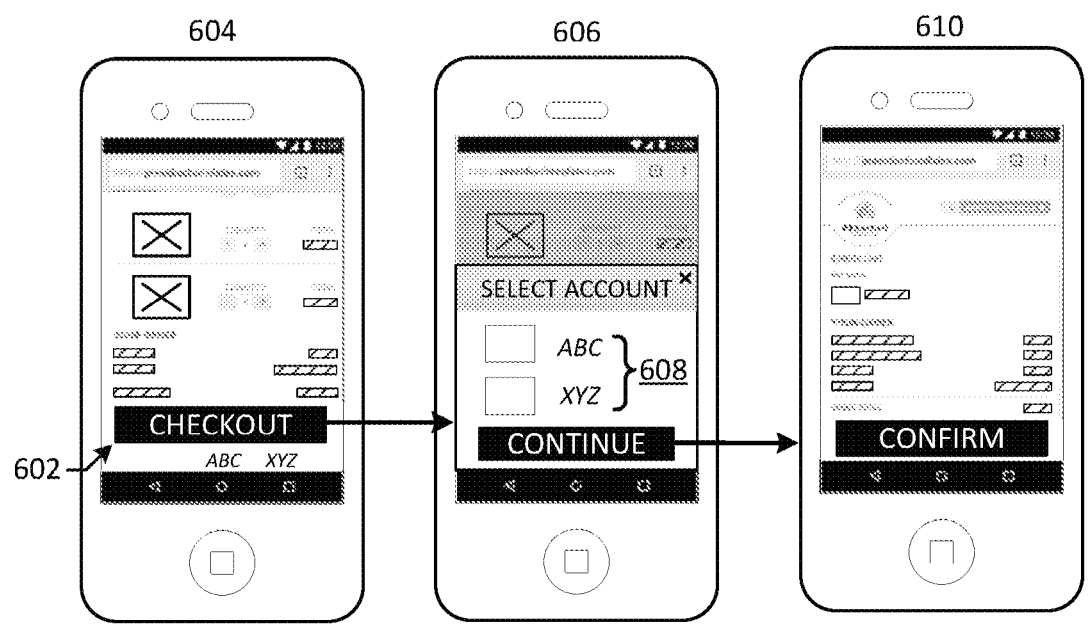
FIG. 6 depicts an example process in which an indication of an account on file is provided to the initiator server by a resource provider in accordance with at least some embodiments.

FIG. 6 depicts an example process in which an indication of an account on file is provided to the initiator server by a resource provider in accordance with at least some embodiments. In this example, a user may be a return customer for a resource provider at which a transaction is to be conducted. In some embodiments, the user may have an account maintained by the resource provider.

In the illustrated example, the user may have previously conducted at least one transaction using the processes described herein. As a result of that process, the resource provider may have received a token generated by the SRT server in the at least one previous transaction upon authentication of the user. In the illustrated example, the resource provider may have stored the received token in relation to the account maintained by the resource provider. Upon the user logging into an account maintained by the resource provider, the resource provider may retrieve the previously-received token.

Upon initiation of a transaction completion process (e.g., by selection of a checkout element 602) in 604, the resource provider (or initiator) may identify a token which was previously used by that user (i.e., a card on file). The resource provider may transmit an account reference ID (e.g., the last for digits of a PAN, a card display name, or other account metadata) and/or the token to the initiator upon selection of the checkout element 602. As depicted at 606, the initiator may then present the previously-used account information 608 to the user for selection. In some embodiments, if the user selects the same account information for which the previously generated token was received, then either the initiator or the resource provider may initiate completion of the new transaction using that token, bypassing one or more of the processes described herein. In some embodiments, as depicted in this example, the initiator may not contact the SRT server as described elsewhere. Instead, the transaction may be completed using the previously received token and the user may be presented with a confirmation screen 610.

Figure 7:
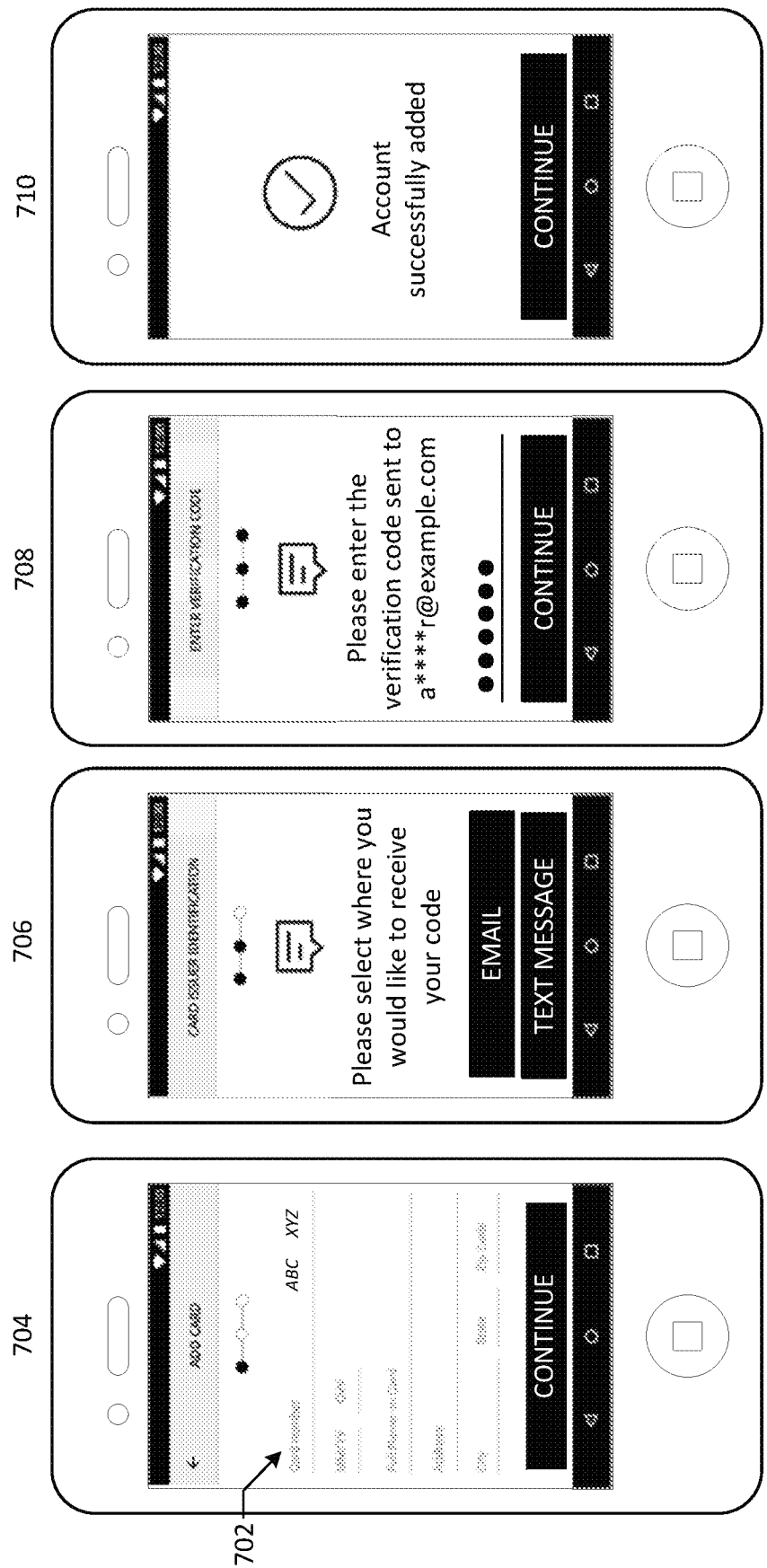
FIG. 7 depicts an example provisioning process by which a user is able to manually add his or her accounts to be processed by the initiator server in accordance with some embodiments.

FIG. 7 depicts an example provisioning process by which a user is able to manually add his or her accounts to be processed by the initiator server in accordance with some embodiments. In at least some embodiments, the process depicted in FIG. 7 may be performed if the initiator is unable to automatically identify one or more accounts associated with a user (e.g., the client device used by the user is new or does not have a cookie in memory). This process enables the user to manually identify one or more accounts.

In this example provisioning process, the user may provide an indication of one or more accounts with which he or she is associated. In some embodiments, the initiator server may contact an authorization entity (e.g., an issuer) associated with the indicated account. In some embodiments, the initiator may contact an SRT server associated with a processing network that the account is associated with. The SRT server may, in turn, communicate with an authorization entity to verify the account. An authorization entity associated with the account may then verify that the user is associated with the account. An authentication process may then be performed as described herein.

In some embodiments, this process may involve requiring a user to provide at least one account number via an input field 702 at 704. The initiator may then determine, based on the account number provided, a transaction processing network and/or an authorization entity associated with the account. It should be noted that at least some account identifiers may include a banking identification number (BIN) that can be used to identify both the transaction processing network and the authorization entity as a portion of the account number. The initiator may then communicate with the identified authorization entity or an SRT platform associated with the identified transaction processing network.

In some embodiments, the identified authorization entity or the SRT platform associated with the identified transaction processing network may identify one or more communication channels associated with the user of the account. The one or more communication channels, or at least an obfuscated version of those communication channels, may be presented to the user at 706 to enable the user to verify his or her ownership of the account via those communication channels. In some embodiments, multiple communication channels may be presented to the user for his or her selection. In some embodiments, a default communication channel may be selected over which to communicate with the user.

Once an appropriate communication channel has been identified, the authorization entity or the SRT platform may transmit verification details to the user via the identified communication channel. In some embodiments, the verification details may include a code or pin. The user may then be required to provide those verification details back at 708 in order to verify that the user at least has access to the communication channel.

In some embodiments, once a user has been verified as being an owner of the account using the techniques depicted in FIG. 7, a cookie may be placed onto the client device from which the process was initiated. The cookie may include identifier information such an as account reference ID (e.g., the last for digits of a PAN, a card display name, or other account metadata) that may be used by the initiator to automatically identify the account in the future.

By way of illustrated example, as depicted in FIG. 7, a user may be prompted to enter an account to be linked to himself or herself at 704. In this example, the authorization entity, once contacted, may initiate a verification process. For example, the authorization entity may provide verification details (e.g., a one-time code) to a communication channel known to be associated with the user. To do this, the authorization entity may provide the user with a choice of communication channel to which the verification details will be transmitted at 706. The user may then be asked to retrieve the verification details in order to verify that the user is authentic at 708. If the verification details provided by the user match those sent via the selected communication channel, then the account may be verified as being associated with the user at 710. It should be noted that the verification process described herein may be separate from the authentication process described elsewhere. In some embodiments, even though the user has verified his or her ownership of an account in the manner depicted in FIG. 7, the user may still be authenticated using the other techniques described herein.

Figure 8:
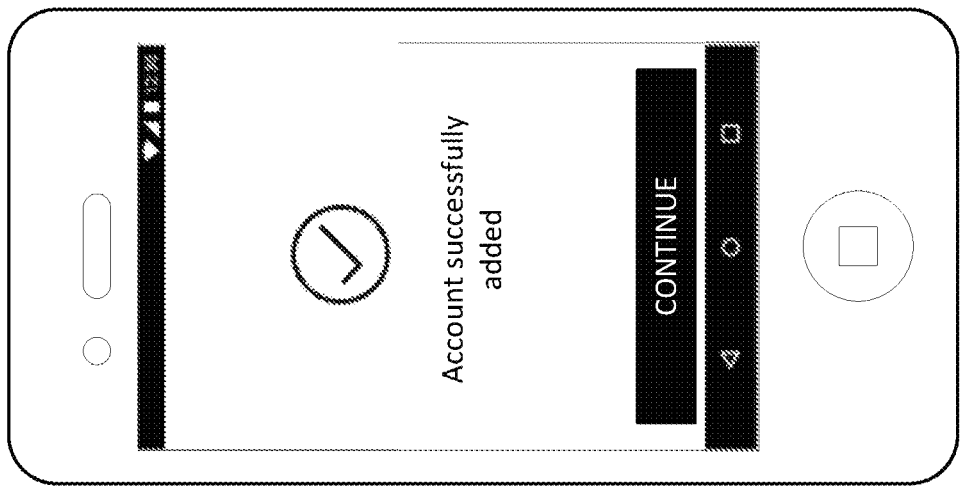
FIG. 8 depicts an example provisioning process in which an SRT platform or an authorization entity pushes an indication of one or more accounts to the initiator server.
Figure 8:
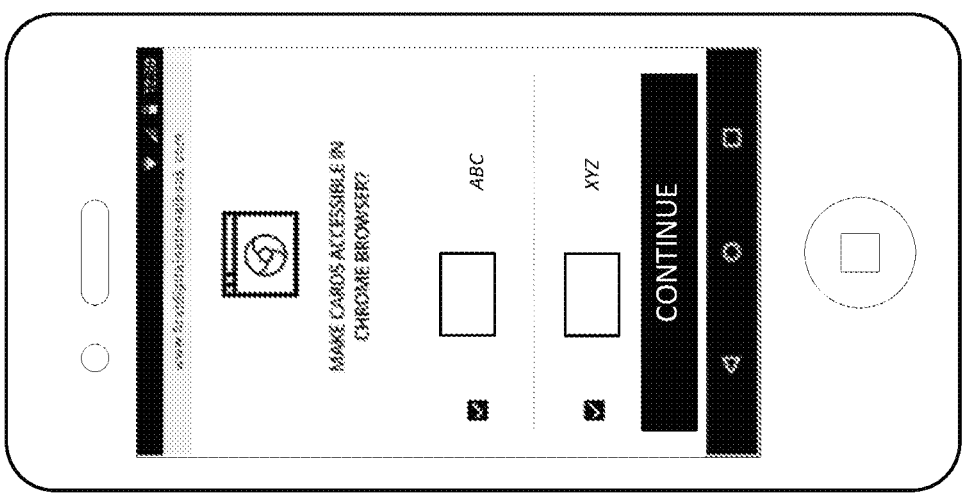
Figure 8:
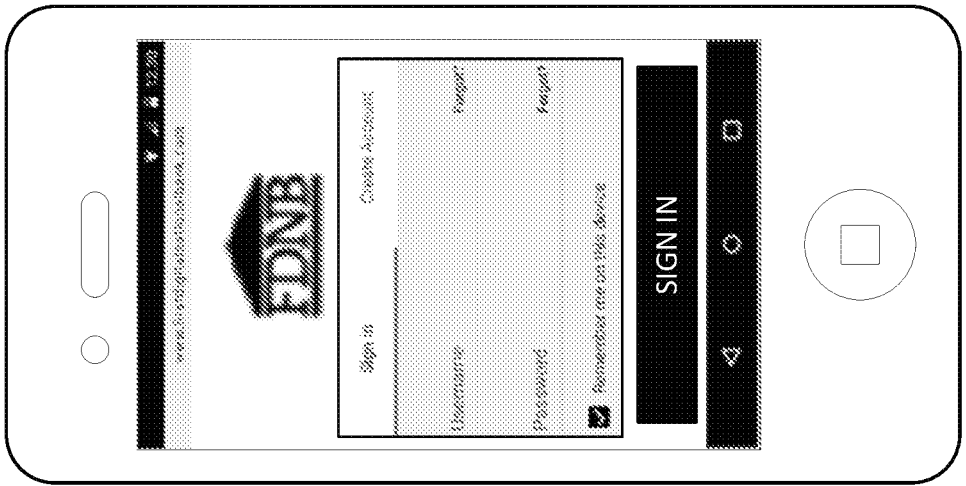

FIG. 8 depicts an example provisioning process in which an SRT platform or an authorization entity pushes an indication of one or more accounts to the initiator server. In some embodiments, a user may log into an account maintained by an SRT platform or authorization entity (e.g., an issuer). Once logged in, various accounts may be identified as being associated with the user account. In some embodiments, an identifier for the user may be provided to the receiving entity via a helper function. It should be noted that in embodiments in which the user logs into an account maintained by an authorization entity, the authorization entity may identify multiple accounts maintained by that authorization entity, each of which may be associated with the same or a different transaction processing network. In contrast, if the user logs into an account maintained by an SRT platform (or a transaction processing network), then the SRT platform may identify multiple accounts, each of which uses the same transaction processing network (the transaction processing network associated with the SRT platform) but may be associated with different authorization entities.

In some embodiments, if the initiator is unable to automatically identify accounts associated with a user, the initiator may provide the ability for the user to manually log into an account associated with either an SRT platform or an authorization entity in order to automatically identify accounts associated with that entity. In this process, the user may select an icon that indicates an appropriate entity into which the user would like to log in. Upon selection of that icon, the user (via his or her client device) may be redirected to a site hosted by the selected entity at 802. Upon reaching this site, the user may be required to provide login credentials (or otherwise authenticate himself/herself) to the selected entity in order to obtain access to an account maintained by the selected entity. Upon obtaining access to the selected entity, the user may be presented with a complete list of the accounts associated with that entity. The user may be given the ability to select some portion of, or all of, the accounts in the list of accounts for transmittal to the initiator at 804. Once the user has selected one or more accounts, the selected entity may be caused to transmit account reference IDs (e.g., the last for digits of a PAN, a card display name, or other account metadata), for each of the selected accounts to the initiator server. A notification may be provided to the user by the initiator server at 806.

In some embodiments, the initiator server may maintain a separate account associated with the user. The user may be asked if he or she wishes to enroll any/all of the accounts associated with the authorization entity and/or SRT platform with the initiator server. If the user indicates that he or she does, then the appropriate entity may provide the account information to the initiator server to be linked to that user's account with the initiator server. In some embodiments, the appropriate entity may transmit a file to the initiator server that includes a mapping between accounts and email data. The accounts indicated in that file may then be mapped to a user account associated with an email address.

In some embodiments, the user may log into an account associated with the initiator server. Upon receiving a request from the user, the initiator server may provide the user's identity, along with a request for account information, to a SRT platform that includes a transaction processing network. In this example, the SRT platform may duplicate the request and route it to a number of different authorization entities. The authorization entities may then each query an account database to determine whether the user is associated with an account that it maintains. The SRT platform may then aggregate each of the accounts identified in this way and may provide those accounts to the initiator server. In some embodiments, the request may be submitted to a number of different SRT platforms.

Figure 9:
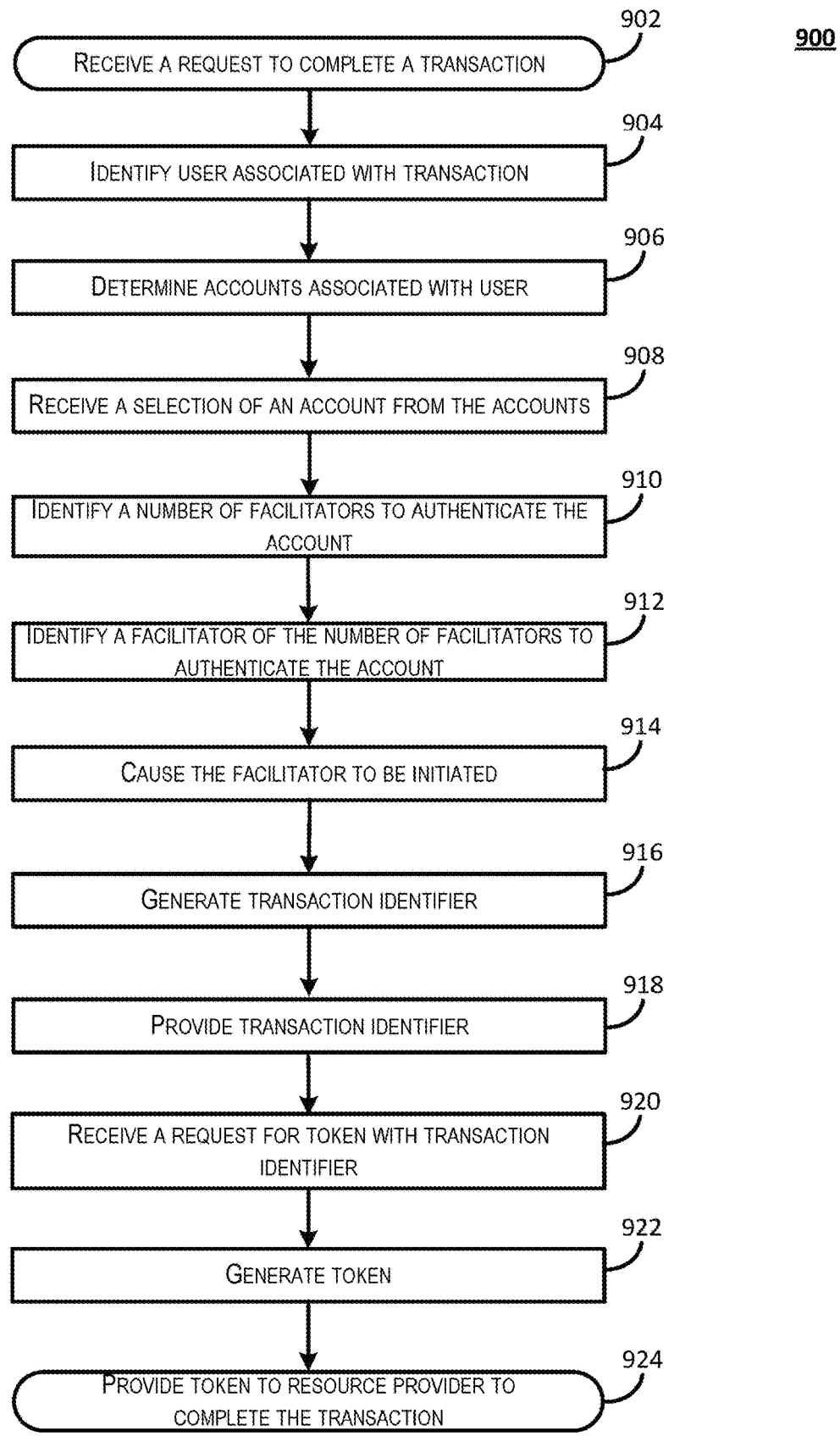
FIG. 9 depicts a flow diagram illustrating a process for completing a transaction in accordance with at least some embodiments.

FIG. 9 depicts a flow diagram illustrating a process for completing a transaction in accordance with at least some embodiments. Some or all of the process 900 (or any other processes described herein, or variations and/or combinations thereof) may be performed under the control of one or more computer systems configured with executable instructions and may be implemented as code (e.g., executable instructions, one or more computer programs or one or more applications). In accordance with some embodiments, the process 900 of FIG. 9 may be performed by at least the SRT server 202 shown in FIG. 2. The code may be stored on a computer-readable storage medium, for example, in the form of a computer program including a plurality of instructions executable by one or more processors. The computer-readable storage medium may be non-transitory.

Process 900 may begin at 902, when a request to complete a transaction is received. In some embodiments, the request may be received from an initiator upon selection of a checkout element on a webpage of a resource provider (e.g., as executed by a communication application on a client device). The request may include information about the user and/or the transaction. In some embodiments, the request may include an identifier that may be used to identify the user. For example, the request may include an email address that may be linked to an account maintained with respect to a user. The user may be identified based on that identifier at 904.

At 906, the process may involve identifying a number of accounts associated with the user. In some embodiments, this may involve querying a number of authorization entities for account information associated with the user. The process may then involve receiving a number of responses from different authorization entities that each include a list of accounts associated with the user. A complete list of accounts associated with the user may be compiled from the received responses from each of the authorization entities. Once compiled, the complete list of accounts may be provided to the initiator for presentation to the user. At 908, a selection of a particular account of the complete list of accounts may be received.

At 910, the process may involve determining a number of facilitators capable of providing authentication for the account. In some embodiments, the authorization entity associated with the account may provide a set of facilitators capable of providing authentication for the account to a SRT platform. In some embodiments, the set of facilitators may be selected based on functionality of a client device associated with the user. A facilitator may be selected from the set of facilitators to be used to authenticate the user at 912. In some embodiments, the facilitator may be selected based on a level of trust associated with the facilitator. In some embodiments the facilitator may be selected from the set of facilitators based on the user's historical use of the selected facilitator. For example, the facilitator may be selected on the grounds that it is the facilitator most commonly used by the user.

At 914, once a facilitator has been selected from the set of facilitators, the process may involve causing the facilitator to initiate an authentication process. In some embodiments, this may involve communicating with a facilitator server. The facilitator server may, in turn, provide instructions to a facilitator application installed upon a client device. The instructions may cause the facilitator application to be executed. Upon execution, the facilitator application may obtain information about the user of the client device. The facilitator application may then authenticate the user based on the obtained information. Upon determining whether the user is authenticated, the facilitator may respond to the request for authentication with an indication as to whether or not the user is authenticated.

At 916, the process may involve, upon determining that the user is authenticated, generating a transaction identifier. The transaction identifier can be linked with the account and/or this specific transaction. This can also include creating and storing a record in the database, the record indicating that the transaction identifier is associated with the selected account.

At 918, the process may involve providing the transaction identifier to the resource provider. This can include transmitting the transaction identifier to the initiator server, and causing the initiator server to forward the transaction identifier to the client device (e.g., a communication application executed on the client device), which can then forward the transaction identifier to the resource provider.

At 920, the process may involve receiving a request for a token. The request can be received from the resource provider (and may have been forwarded by the initiator server), and the request can include the transaction identifier as well as any other suitable information.

At 922, the process may involve identifying the account based on the transaction identifier, and then generating a token for the account to be used in the transaction. In some embodiments, the token may be a one-time use token. In some embodiments, the token may only be used by the resource provider associated with the transaction for transactions completed with respect to a single user.

At 922, the process may involve providing the token to the resource provider. The resource provider when the use the token to complete the transaction (e.g., by submitting an authorization request message including the token in a data field for account credentials). In some embodiments, the resource provider may store the token for use in future transactions.

Embodiments of the disclosure may provide a number of advantages over conventional systems. For example, the system described herein enables a resource provider to complete transactions using a number of different types of transaction processing options regardless of the architecture used by the resource provider. Furthermore, new transaction processing options may be incorporated without any further action by the resource provider. In addition, resource providers can take advantage of user authentication techniques installed on a user's own client device, decreasing the risk of fraud associated with conducting the transaction.

Embodiments of the invention provide more flexibility than conventional authentication systems. For example, by using an initiator server, a user's mobile device can be affiliated with and updated with different facilitators with different authentication capabilities over time, without making substantial changes to the authentication infrastructure. Facilitators can be updated or created, independently of resource providers, the initiator can be updated to allow the user's mobile device to effectively interact with those new and/or updated facilitators. This advantages can also be applied to the use of different SRT (secure remote transaction) systems that may be associated with the user's mobile device, and that may be updated and/or added. Stated different, by using the initiator as in embodiments of the invention, authentication systems involving disparate entities can be updated and changed, with much difficulty as compared to conventional systems.

Figure 10:
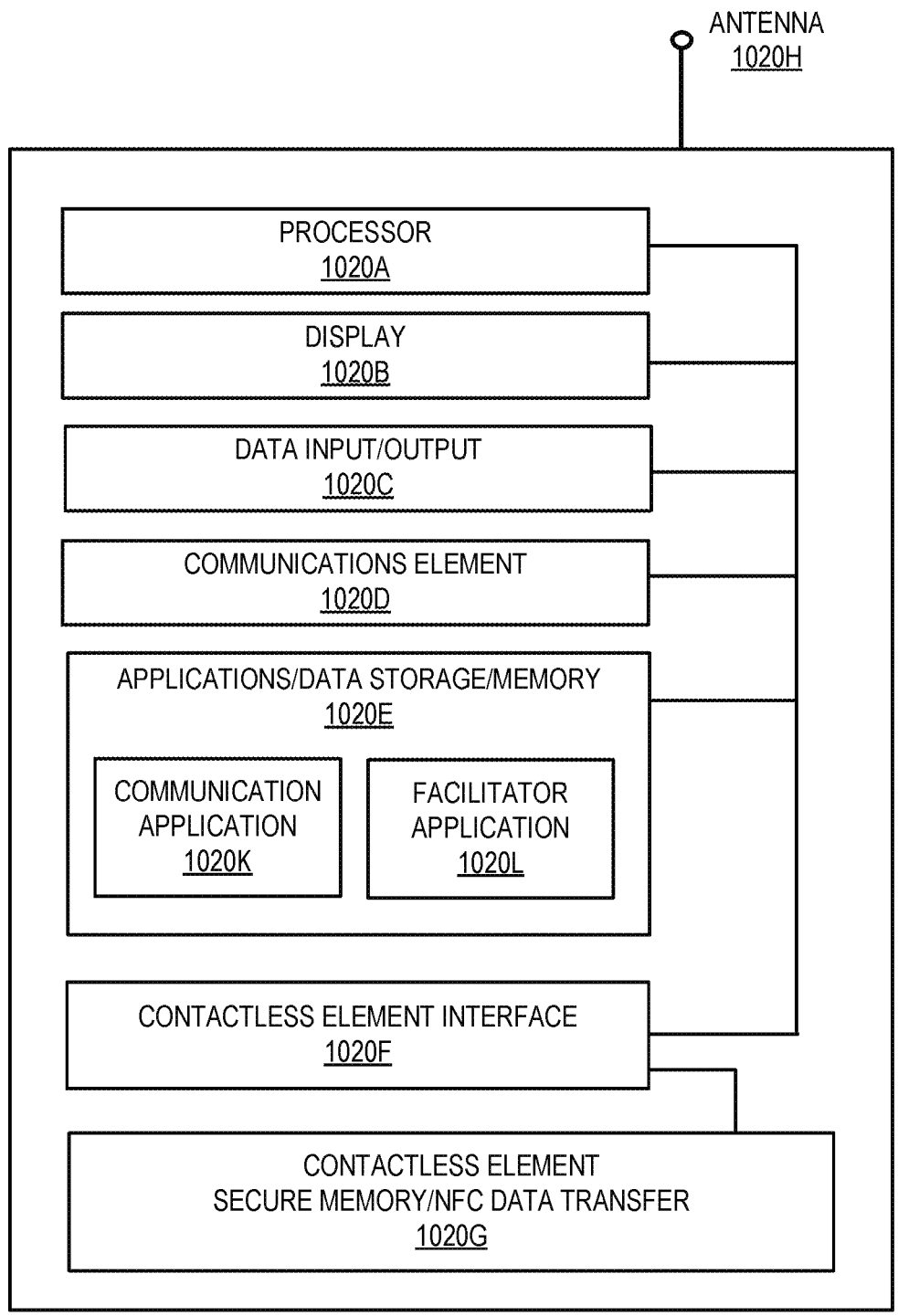
FIG. 10 shows an example of the client device 920, according to some embodiments of the invention.

FIG. 10 shows an example of the client device 1020, according to some embodiments of the invention. Client device 1020 may include circuitry that is used to enable certain device functions, such as telephony. The functional elements responsible for enabling those functions may include a processor 1020A that can execute instructions that implement the functions and operations of the device. Processor 1020A may access memory 1020E (or another suitable data storage region or element) to retrieve instructions or data used in executing the instructions, such as provisioning scripts and mobile applications. Data input/output elements 1020C, such as a keyboard or touchscreen, may be used to enable a user to operate the client device 1020 and input data (e.g., user authentication data). Data input/output elements 1020C may also include biometric sensors. Data input/output elements may also be configured to output data (via a speaker, for example). Display 1020B may also be used to output data to a user. Communications element 1020D may be used to enable data transfer between client device 1020 and a wired or wireless network (via antenna 1020H, for example) to assist in connectivity to the Internet or other network, and enabling data transfer functions. Client device 1020 may also include contactless element interface 1020F to enable data transfer between contactless element 1020G and other elements of the device, where contactless element 1020G may include a secure memory and a near field communications data transfer element (or another form of short range communications technology). As noted, a cellular phone or similar device is an example of a client device 1020 that may be used in accordance with embodiments of the present invention. However, other forms or types of devices may be used without departing from the underlying concepts of the invention. For example, the mobile computing device 1020 may be in the form of a portable device, a key fob, a tablet computer, vehicle, a wearable device, etc.

The memory 1020E may comprise at least a communication application 1020K (e.g., a browser application) and a facilitator application 1020L, and any other suitable module or data. The client device 1020 may have any number of mobile applications installed or stored on the memory 1020E and is not limited to that shown in FIG. 10.

Embodiments of the disclosure provide for a number of technical advantages over conventional systems. For example, unlike conventional transaction processing systems, embodiments of the system enable a user to quickly access each of his or her accounts without the need to enter sensitive information (e.g., a PAN), which may be insecurely transmitted and subsequently intercepted by an unauthorized third party. Additionally, each transaction can be provided a one-time use token, which increases the security of the transaction as the one-time use token may only be used for the specific transaction at issue. Further, embodiments improve the efficiency of and data security for transmitting account credentials, the introduction of a transaction identifier allows a resource provider to directly obtain the account credentials (e.g., a token). This provides an alternative communication channel for transmitting the account credentials, such that they do not need to be sent back through the user device and/or communication application in order to reach the resource provider.

A computer system may be used to implement any of the entities or components described above. The subsystems that may be included include system bus. Additional subsystems include a printer, keyboard, storage device, and monitor, which are coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus allows the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within one or more computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:

receiving, by a communication application of a user device, a request to complete a transaction associated with a user;

determining, by the communication application of the user device, a plurality of accounts associated with the user;

receiving, by the communication application of the user device, a selection of an account from the plurality of accounts;

sending, by the communication application of the user device, a request for a transaction identifier associated with the selected account to a server computer, the request including user identifier information and a facilitator application identifier, wherein the facilitator application identifier is one of a plurality of facilitator application identifiers that are respectively associated with a plurality of facilitator applications stored on the user device, wherein the received facilitator application identifier identifies a facilitator application capable of supporting the selected account;

receiving, from the server computer by the facilitator application associated with the facilitator application identifier, instructions that cause execution of the facilitator application for authenticating the user to provide an authentication indicator based at least on the user identifier information;

executing, by the user device, the facilitator application to authenticate the user using biometric information of the user and to generate the authentication indicator;

transmitting, by the user device, the authentication indicator to the server computer based on authenticating the user;

receiving, by the communication application of the user device, the transaction identifier from the server computer;

accessing, by the communication application of the user device, a resource provider webpage being executed on the user device, the resource provider webpage being associated with a resource provider computer; and transmitting, by the communication application of the user device, the transaction identifier to the resource provider computer via the resource provider webpage, wherein the resource provider computer subsequently transmits the transaction identifier to the server computer, and wherein the server computer responds to the resource provider computer by transmitting account credentials associated with the selected account.

2. The method of claim 1, wherein the communication application is a browser application executed on the user device.

3. The method of claim 1, wherein receiving the transaction identifier from the server computer takes place via a first communication channel, the first communication channel including the server computer and the communication application, and wherein the transmitting the transaction identifier to the server computer by the resource provider computer takes place via a second communication channel, the second communication channel including the server computer and the resource provider computer, the second communication channel not including the communication application.

4. The method of claim 1, wherein the resource provider computer subsequently uses the account credentials to complete the transaction.

5. The method of claim 1, wherein the user identifier information and the facilitator application identifier are stored in one or more cookies of the user device.

6. A user device comprising:

a processor; and a non-transitory computer readable medium, the non-transitory computer readable medium comprising code, executable by the processor, for implementing a method including:

receiving, by a communication application of the user device, a request to complete a transaction associated with a user;

determining, by the communication application of the user device, a plurality of accounts associated with the user;

receiving, by the communication application of the user device, a selection of an account from the plurality of accounts;

sending, by the communication application of the user device, a request for a transaction identifier associated with the selected account to a server computer, the request including user identifier information and a facilitator application identifier, wherein the facilitator application identifier is one of a plurality of facilitator application identifiers that are respectively associated with a plurality of facilitator applications stored on the user device, wherein the received facilitator application identifier identifies a facilitator application capable of supporting the selected account;

receiving, from the server computer by the facilitator application associated with the facilitator application identifier, instructions that cause execution of the facilitator application for authenticating the user to provide an authentication indicator based at least on the user identifier information;

executing the facilitator application to authenticate the user using biometric information of the user and to generate the authentication indicator;

transmitting the authentication indicator to the server computer based on authenticating the user;

receiving, by the communication application of the user device, the transaction identifier from the server computer;

accessing, by the communication application of the user device, a resource provider webpage being executed on the user device, the resource provider webpage being associated with a resource provider computer; and transmitting, by the communication application of the user device, the transaction identifier to the resource provider computer via the resource provider webpage, wherein the resource provider computer subsequently transmits the transaction identifier to the server computer, and wherein the server computer responds to the resource provider computer by transmitting account credentials associated with the selected account.

7. The user device of claim 6, wherein the non-transitory computer readable medium includes a browser application.

8. The user device of claim 6, wherein the account credentials include a token.

9. The user device of claim 6, wherein the request for the transaction identifier includes information identifying the selected account.

10. The user device of claim 6, wherein the resource provider computer subsequently uses the account credentials to complete the transaction.

11. The user device of claim 6, wherein the user identifier information is maintained in one or more cookies of the user device.

12. The user device of claim 6, wherein the authentication indicator includes a cryptogram or a flag.

13. The user device of claim 6, wherein the account credentials include a primary account number (PAN).

14. The method of claim 1, further comprising:
   prior to the receiving the selection of the account, providing, by the communication application, a display window on the user device, the display window displaying the plurality of accounts; and
   receiving, by the communication application, a user input through the display window, the user input providing the selection of the account from the plurality of accounts displayed in the display window.

15. The method of claim 1, wherein the facilitator application is associated with a facilitator server.

* * * * *